US009563639B2

(12) United States Patent
Arai

(10) Patent No.: US 9,563,639 B2
(45) Date of Patent: Feb. 7, 2017

(54) INFORMATION STORING DEVICE, INFORMATION STORING SYSTEM AND METHOD

(71) Applicant: Masaki Arai, Tokyo (JP)

(72) Inventor: Masaki Arai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 400 days.

(21) Appl. No.: 13/934,481

(22) Filed: Jul. 3, 2013

(65) Prior Publication Data

US 2014/0019499 A1    Jan. 16, 2014

(30) Foreign Application Priority Data

Jul. 10, 2012  (JP) ................................ 2012-154921
May 10, 2013  (JP) ................................ 2013-100636
Jun. 18, 2013  (JP) ................................ 2013-127511

(51) Int. Cl.
*G06F 17/30* (2006.01)
*G06Q 10/06* (2012.01)

(52) U.S. Cl.
CPC ..... *G06F 17/30194* (2013.01); *G06Q 10/0633* (2013.01); *G06F 17/30091* (2013.01)

(58) Field of Classification Search
CPC ........................... G06F 17/30; G06F 17/30091
USPC .............. 707/827, 706, 713, 722, 736, 758, 707/781–783, 999.001–999.002; 713/166; 358/1.15
See application file for complete search history.

(56) References Cited

U.S. PATENT DOCUMENTS

| 7,512,791 B1* | 3/2009 | Sato ............................... 713/166 |
| 8,127,178 B2* | 2/2012 | Mizuno ........................... 714/20 |
| 2008/0151293 A1* | 6/2008 | Narukawa .................... 358/1.15 |

FOREIGN PATENT DOCUMENTS

| JP | 2008-191711 | 8/2008 |
| JP | 2009-134613 | 6/2009 |

* cited by examiner

*Primary Examiner* — Syling Yen
(74) *Attorney, Agent, or Firm* — IPUSA, PLLC

(57) ABSTRACT

An information storing device includes a storage device in which one or more storage areas are generated for storing electronic data therein, wherein in the storage device at least one of first and second processes is set on a storage area basis; a storing part configured to, when the information storing device has received electronic data and a designation of the storage area from one of a plurality of electronic apparatuses, store the received electronic data in the storage area designated by the received designation; and an executing part configured to, when the received electronic data is stored by the storing part, perform the first process on the stored electronic data if the first process is set in the storage area in which said electronic data is stored, and perform the second process using the stored electronic data if the second process is set in the storage area in which said electronic data is stored.

10 Claims, 25 Drawing Sheets

FIG.6

SETTING > WORKFLOW SETTING

[<< RETURN TO LIST]

PLEASE INPUT WORKFLOW SETTING, AND CLICK [APPLY]
REQUIRED INPUT ITEMS ARE INDICATED BY *

WORKFLOW SETTING

[APPLY]

| | |
|---|---|
| WORKFLOW NAME*: | GENERATING IMAGE FOR PROJECTOR |
| | NAME SET HERE BECOMES A NAME OF FILE INPUT FOLDER |
| FILE CONVERSION FORMAT*: | JPEG FOR PROJECTOR |
| | ☐ CONVERTING TEXT ATTACHED PDF |
| | IN THE CASE OF PDF FORMAT, CHECKING "CONVERTING ATTACHED PDF" CAN ADD TEXT INFORMATION WITH OCR PROCESS |
| ORIGINAL DOCUMENT KEEPING RETENTION*: | ☑ KEEP ORIGINAL DOCUMENT<br>• IF THIS SETTING IS INVALID, ORIGINAL DOCUMENT IS AUTOMATICALLY DELETED AFTER EXECUTION OF WORKFLOW<br>• IF THIS SETTING IS VALID, ORIGINAL DOCUMENT IS NOT AUTOMATICALLY DELETED, AND MOVED TO [backup] FOLDER IN WORKFLOW FOLDER. |

TRANSMISSION DESTINATION/FILE DESTINATION*

DESIGNATE DESTINATION OF FOLDER IN WHICH WORKFLOW PROCESSING RESULT IS TO BE STORED

FOLDER DESTINATION LIST:

OWN DESTINATION

MEETING RECORD
DAILY REPORT
PRESENTATION MATERIAL

[ADD >>]
[<< DELETE]

DESTINATION FOLDER TO BE USED:

PRESENTATION MATERIAL

DIRECT INPUT:

INDIVIDUAL FOLDER

[REFERENCE..]   [ADD >>]

E-MAIL TRANSMISSION DESTINATION*

DESIGNATE DESTINATION OF E-MAIL TO WHICH WORKFLOW PROCESSING RESULT IS TO BE TRANSMITTED

E-MAIL DESTINATION LIST:

OWN DESTINATION abcd@xxxx.co.jp
xyz@xxxxx.ne.jp
MR. NAKAMURA
MR. SUZUKI

[ADD >>]
[<< DELETE]

DESTINATION FOLDER TO BE USED:

DIRECT INPUT:

[ADD >>]

600

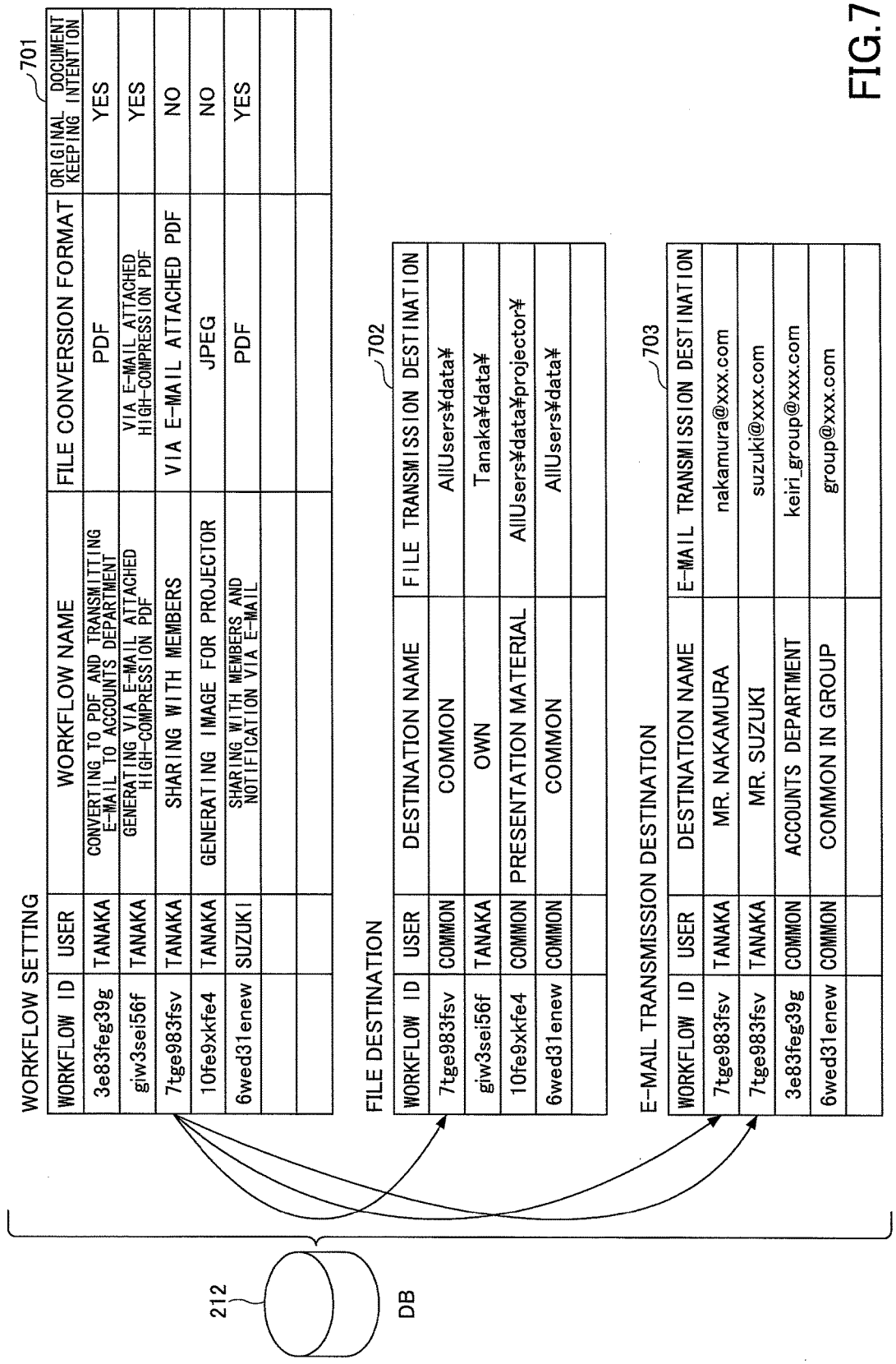

FIG.9

| # | PROTOCOL | METHOD | EXPLANATION | EXAMPLE |
|---|---|---|---|---|
| 1 | HTTP | GET | FOLDER LIST ACQUISITION | http://<IP ADDRESS>/folder?folderPath=AllUsers/data/test<br>&startIndex=1<br>&count=10 |
| 2 | HTTP | GET | THUMBNAIL IMAGE ACQUISITION | http://<IP ADDRESS>/folder/thumbnail?filePath=AllUsers/data/test.doc |
| 3 | HTTP | GET | PDF FILE ACQUISITION | http://<IP ADDRESS>/folder/image?filePath=AllUsers/data/test.doc |
| 4 | HTTP | GET | RPCS FILE ACQUISITION | http://<IP ADDRESS>/folder/rpcs?<br>filePath=AllUsers/data/test.doc<br>&printCopies=1<br>&printDocumentSize=A4<br>&printPaperSize=A4<br>&printDocumentOrientation=Portrait<br>&printColorBw=Color<br>&printSort=Sort<br>&printDuplex=None<br>&printLayout=None |
| 5 | HTTP | GET | IMAGE FILE ACQUISITION | http://<IP ADDRESS>/folder/image?filePath=AllUsers/data/test.doc<br>&pageNumber=1 |

FIG.10

```
{"filelist":[{"name":"20091106.ppt",
    "size":2137088,
    "last_access_time":1323148816453,
    "is_dir":false,
    "last_modified_time":1282784936697,
    "creation_time":1317084202953,
    "convertible_format":["thumbnail","jpeg","pdf","rpcs"],
    "converted_format":["thumbnail"],
    "total_pages":20}, {"name":"Blue hills.jpg",
    "size":28521,
    "last_access_time":1322740650125,
    "is_dir":false,
    "last_modified_time":1091707200000,
    "creation_time":1315479900890,
    "converted_format":,
    "total_pages":1}]

"total_results":20}
```

|    | CATEGORY NAME |                    | RANGE    | EXPLANATION              |
|----|---------------|--------------------|----------|--------------------------|
| 1  | filelist      | name               | String   | IT FOLDER NAME           |
| 2  |               | size               | long     | FILE SIZE (BYTE NUMBER)  |
| 3  |               | is_dir             | boolean  | FOLDER:true, FILE:false  |
| 4  |               | last_access_time   | long     | ACCESS DATE AND TIME     |
| 5  |               | last_modified_time | long     | LAST UPDATE DATE AND TIME|
| 6  |               | creation_time      | long     | GENERATION DATE AND TIME |
| 7  |               | convertible_format | String[] | CONVERTIBLE FILE FORMAT  |
| 8  |               | converted_format   | String[] | CONVERTED FILE FORMAT    |
| 9  |               | total_pages        | int      | TOTAL PAGE NUMBER        |
| 10 | total_results |                    | int      | TOTAL RESULT NUMBER      |

FIG.15

| # | PROTOCOL | METHOD | EXPLANATION | REQUEST URL | REQUEST BODY |
|---|---|---|---|---|---|
| 1 | HTTP | POST | FOLDER GENERATION | http://IP ADDRESS/folder/operation/create_folder | {"path":"/AllUsers/data/share"} |
| 2 | HTTP | POST | DELETION OF FOLDER OR FILE | http://IP ADDRESS/folder/operation/delete | {"path":"/AllUsers/data/share"} |
| 3 | HTTP | POST | COPY OF FOLDER OR FILE | http://IP ADDRESS/folder/operation/copy | {"from_path":"/AllUsers/data/share1", "to_path":"/AllUsers/data/share2", "overwrite":true} |
| 4 | HTTP | POST | FILE UPLOAD | http://IP ADDRESS/folder/files?filePath=AllUsers/data/test.doc&overwrite=true | |

FAX TRANSMISSION MFP [_____] SELECTION | DIRECT ACQUISITION

DESTINATION [_____] SELECTION

PRESENCE OR ABSENCE OF COVER SHEET

● COVER SHEET ATTACHED    ○ NO COVER SHEET ATTACHED

OK   CANCEL

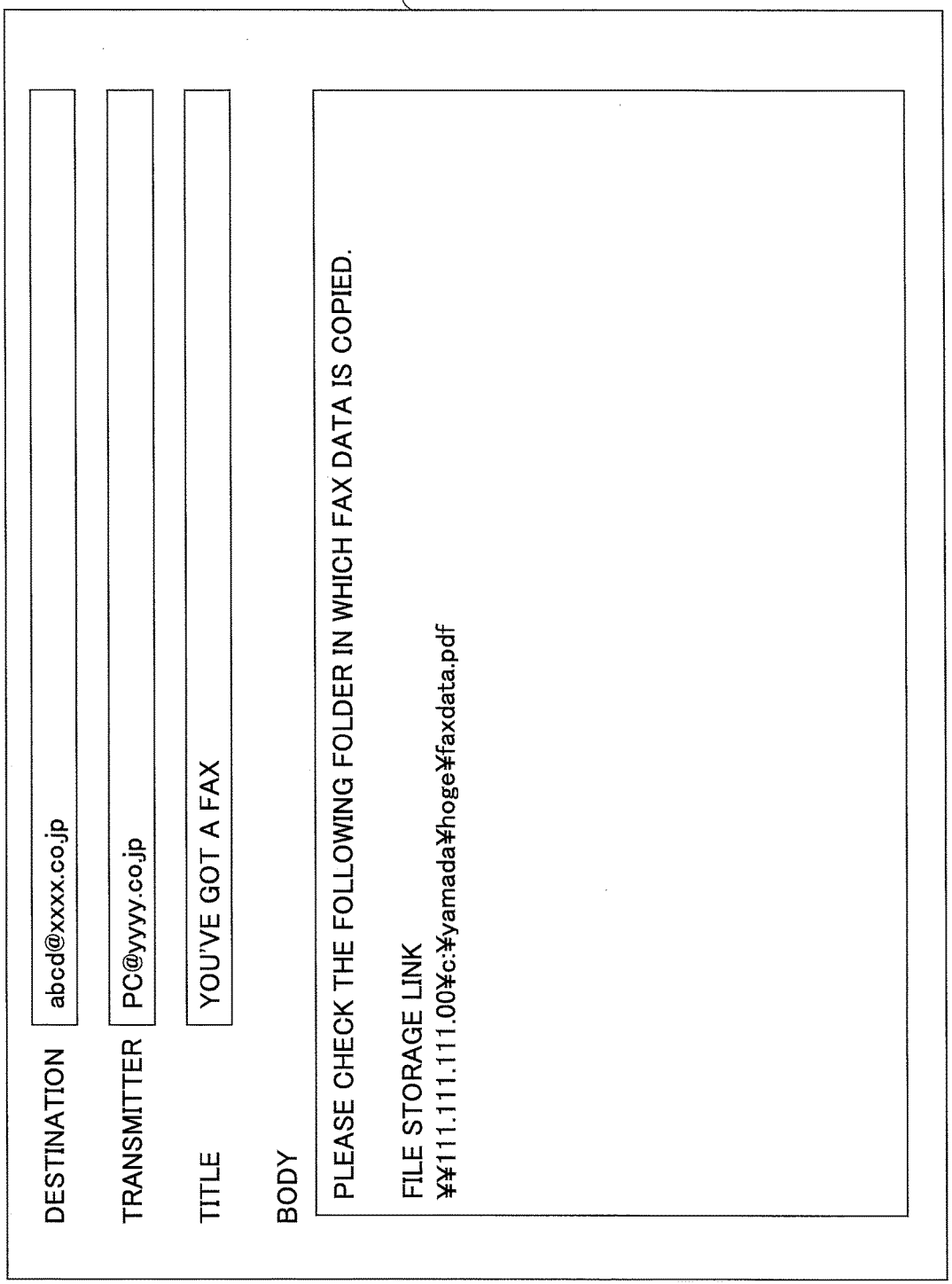

INFORMATION STORING DEVICE, INFORMATION STORING SYSTEM AND METHOD

FIELD

This disclosure is related to an information storing device, an information storing system and a method.

BACKGROUND

For example, Japanese laid-open patent publication No. 2008-191711 discloses a printing system utilizing a personal computer wherein when data is input into a particular folder as a hot folder, a print process set in advance for the folder is performed for the input data.

In recent years, users are utilizing various electronic apparatuses for outputting electronic data such as a printer, a Multi Function Peripheral and a projector, and various information processing devices such as a mobile phone, a smart phone and a tablet terminal. In a system where the electronic apparatus and the information processing device are utilized in cooperation, value is expected to be improved by utilizing these electronic apparatus and information processing devices in cooperation.

However, according to a prior art system utilizing the electronic apparatuses and the information processing devices, the respective information processing devices, that utilize a folder (a process defined folder) with which a predefined processing is performed for the input data, need to have functions of storing the data in the folder. Further, functions of displaying the folder and storing the data in the folder need to be adapted to the apparatus that has the process defined folder.

In this way, according to the prior art system utilizing the electronic apparatuses and the information processing devices, it is difficult to coordinate the electronic apparatuses and the information processing devices with the apparatus that has the process defined folder in utilizing the process defined folder.

An object of this disclosure is to provide an information storing device, an information storing system and a method that can execute processing utilizing a process defined folder in conjunction with each other.

SUMMARY

According to one aspect of this disclosure, an information storing device is provided, which includes a storage device in which one or more storage areas are generated for storing electronic data therein, wherein in the storage device at least one of first and second processes can be set on a storage area basis, the first process is to be performed on the electronic data stored in the storage area and the second process is to be performed using the electronic data stored in the storage area; a storing part configured to, when the information storing device has received electronic data and a designation of the storage area among the storage areas of the storage device from one of a plurality of electronic apparatuses, store the received electronic data in the storage area designated by the received designation; and an executing part configured to, when the received electronic data is stored by the storing part, perform the first process on the stored electronic data if the first process is set in the storage area in which said electronic data is stored, and perform the second process using the stored electronic data if the second process is set in the storage area in which said electronic data is stored.

BRIEF DESCRIPTION OF DRAWINGS

FIG. 6 is an image diagram for illustrating an example of a workflow setting screen.

FIG. 7 is a diagram for illustrating an example of a configuration of values of a workflow setting stored in a DB.

FIG. 9 is a diagram for explaining an example of an HTTP request that the information storing device accepts.

FIG. 10 is a diagram for illustrating an example of a configuration of a response for a folder list acquiring demand.

FIG. 15 is a diagram for explaining an example of an HTTP request that the information storing device accepts.

FIG. 21 is a diagram for illustrating an example of a setting screen for a facsimile transmission workflow displayed on a smart phone.

FIG. 25 is an image diagram for illustrating an example of an e-mail in which a file storage link is described in a main sentence.

DESCRIPTION OF EMBODIMENTS

In the following, embodiments are described in detail with reference to appended drawings.

First Embodiment

System Configuration

Figure 1:
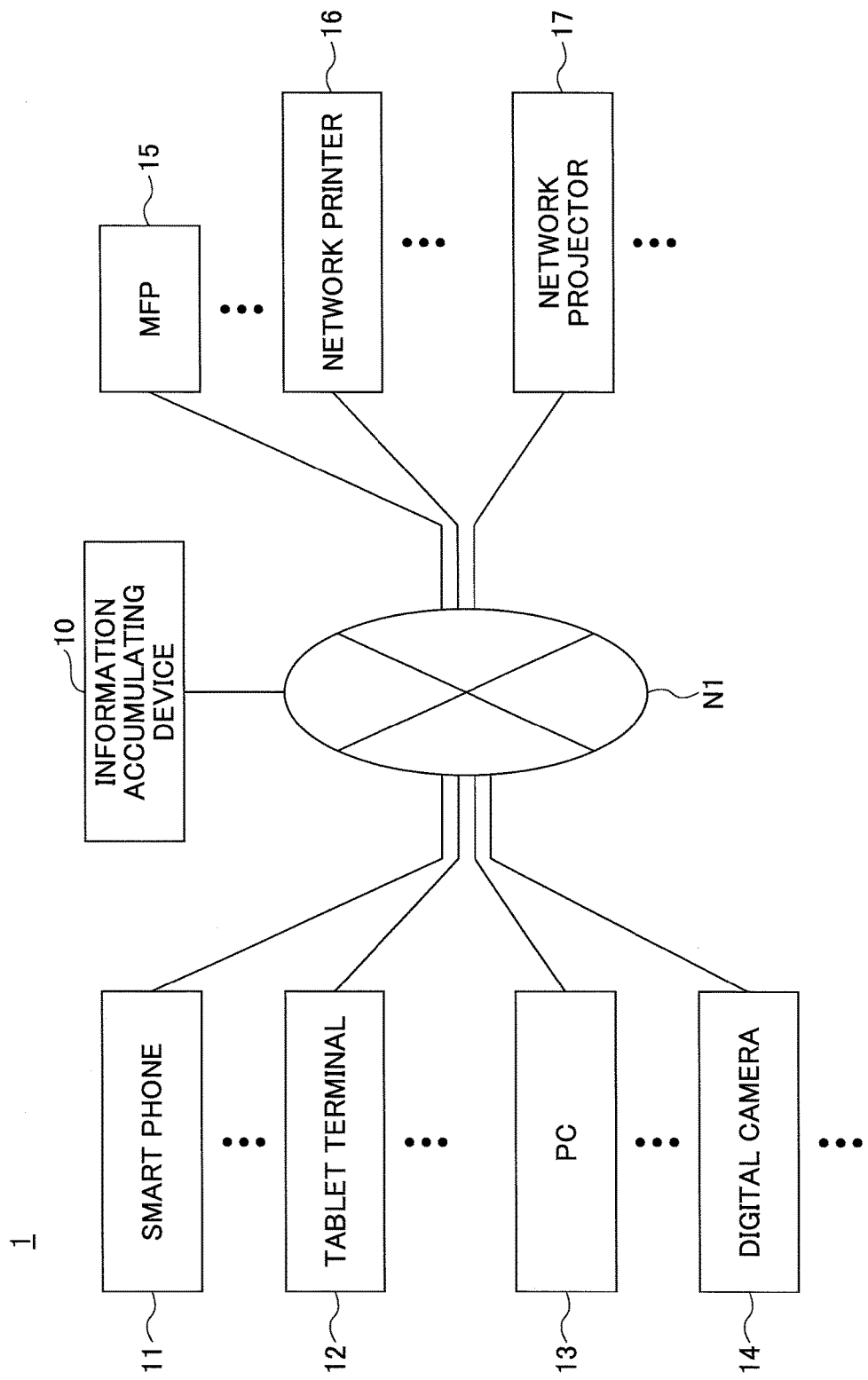
FIG. 1 is a diagram for illustrating an example of a configuration of a cooperative processing system according to an embodiment.

FIG. 1 is a diagram for illustrating an example of a configuration of a cooperative processing system according to an embodiment. In the example of the cooperative processing system illustrated in FIG. 1, an information storing device 10, one or more smart phones 11, one or more tablet terminals 12, one or more PCs 13, one or more digital cameras 14, one or more MFPs (Multi Function Peripheral) 15, one or more network printers 16, and one or more network projectors 17 are coupled to a network N1.

The network N1 is an intranet, internet, or the like that utilizes wired LAN (Local Area Network), wireless LAN, or the like, and enables communications between different devices. The smart phone 11 and the tablet terminal 12 are examples of an information processing device that is carried and operated by a user. The information processing device may be a device that the user can operate.

The smart phone 11 and the tablet terminal 12 each have a wireless communication function, for example, and functions of displaying, storing, transmitting and receiving various files. Further, the smart phone 11 and the tablet terminal 12 each have a camera device incorporated therein, and is capable of taking a picture, etc.

The PC 13 is a desktop PC or a portable PC, for example. The PC 13 is capable of performing various types of file manipulation such as generating new files, updating files, deleting files and renaming files for a folder of the information storing device 10 by utilizing SMB (Server Message Block) protocol of the network N1. It is noted that the folder is often referred to as a "directory", and is an example of a storage location in which data or files are stored. The PC 13 is an example of a information processing device.

The digital camera 14 has a wireless communication function, for example, and is capable of storing a captured image file in the folder of the information storing device 10. Further, the digital camera 14 is capable of displaying the image file stored in the folder of the information storing device 10.

The MFP 15, the network printer 16 and the network projector 17 are examples of an electronic apparatus for outputting electronic data. The MFP 15 is an example of an image forming device. The MFP 15 is an image forming device that has multi-functions including a copy function, a facsimile (FAX) function, a print function, a scanner function, a function of distributing input images, etc. The input image includes a document image read by the scanner function and images input by the print function and the facsimile functions. The MFP 15 is capable of designating and printing the file stored in the information storing device 10. Further, the MFP 15 is capable of storing the document image read by the scanner function in the information storing device 10. The MFP 15 has a browser installed therein and the scanner function or the print function can be utilized from a Web application operated on the browser.

The network printer 16 is an example of an image forming device that has the print function. The network printer 16 has functions including a function of printing the file stored in the information storing device 10 via the network N1, etc.

The network projector 17 is an example of an image projecting device that has a projector function. The network projector 17 is capable of accessing the information storing device 10 via the network N1. The network projector 17 has functions including a function of projecting and displaying the file stored in the information storing device 10, etc.

It is noted that devices other than the smart phone 11, the tablet terminal 12, the PC 13, the digital camera 14, the MFP 15, the network printer 16 and the network projector 17 may be used in the present embodiment as long as the devices are capable of connecting to the network N1 and handling a general-purpose image file format.

The information storing device 10 is an example of a cooperative processing device. The information storing device 10 has a function as a server that is capable of acquiring and storing files from other devices such as the smart phone 11 and the MFP 15. Further, the information storing device 10 has a function of performing processing such as a predefined format conversion of the file, transmission of an e-mail, etc., when the file is stored in a process defined folder. It is noted that the process defined folder is referred to as a "workflow folder", hereinafter.

Further, the information storing device 10 is capable of communicating the respective devices via the network N1. The information storing device 10 is capable of causing the electronic devices such as MFP 15 to output electronic data in cooperation with the information processing device such as the smart phone 11. It is noted that the information storing device 10 may be formed by a plurality of computers in a decentralized manner.

[Hardware Configuration]

Figure 2:
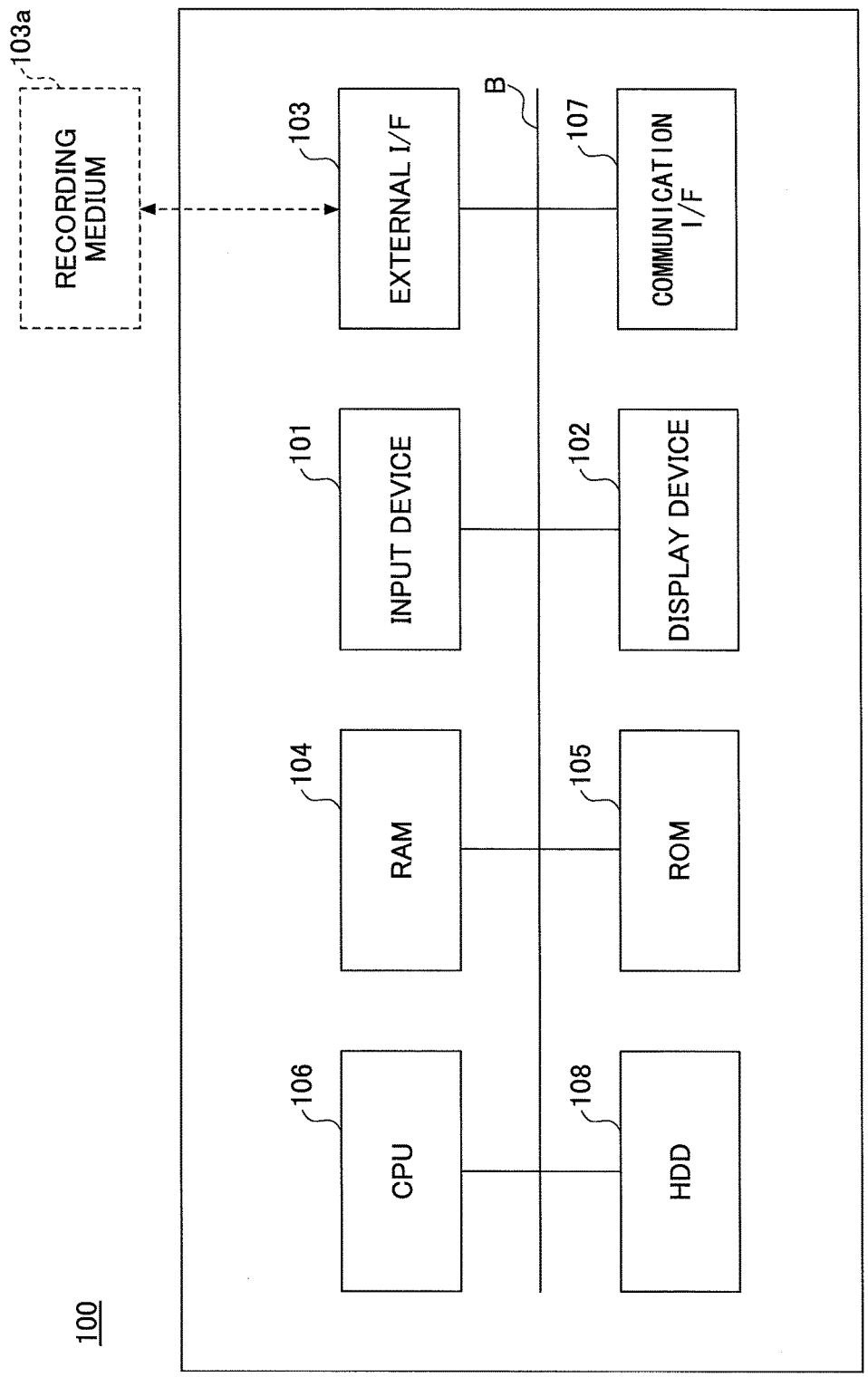
FIG. 2 is a diagram for illustrating an example of a hardware configuration of a computer system according to the embodiment.

The information storing device 10 is formed by a computer system having a hardware configuration illustrated in FIG. 2, for example. It is noted that the information processing devices such as the smart phone 11, the tablet terminal 12, and the PC 13 each include such a hardware configuration as illustrated in FIG. 2. FIG. 2 is a diagram for illustrating an example of a hardware configuration of a computer system according to the embodiment.

In the example illustrated in FIG. 2, the computer system 100 includes an input device 101, a display device 102, an external I/F 103, a RAM 104, a ROM 105, a CPU 106, a communication I/F 107, a HDD 108, etc., that are interconnected via a bus B. The input device 101 includes a keyboard, a mouse or the like, and is used to input operation signals to the computer system 100.

The display device 102 includes a display, etc., and displays a processing result of the computer system 100. The communication I/F 107 connects the computer system 100 to the network N1. With this, the computer system 100 can perform data communication with other devices and apparatuses via the communication I/F 107.

The HDD 108 is a nonvolatile storage that stores programs and data. The stored programs and data include an OS (Operating System) that is a basic software item for controlling the computer system 100 as a whole, and application software items for providing various functions on the OS. Further, the HDD 108 manages the stored programs and data with a predetermined file system and/or DB (Data Base).

The external I/F 103 is an interface with external devices. The external devices include a recording medium 103a or the like. Thus, the computer system 100 can perform writing and/or reading of the recording medium 103a via the external I/F 103. It is noted that the recording medium 103a includes a flexible disk, a CD, a DVD (Digital Versatile Disk), a SD memory card, a USB memory (Universal Serial Bus memory), etc.

The ROM 105 is a nonvolatile semiconductor memory (storage) that can hold programs and data even if power is turned off. The ROM 105 stores programs and data such as a BIOS (Basic Input/Output System) that is executed at the time of starting up the computer system 100, an OS setting, and a network setting. The RAM 104 is a volatile semiconductor memory (storage) that can temporarily hold the programs and data.

The CPU 106 is a calculating device that reads the programs and data from the storage such as the ROM 105 and the HDD 108 and writes them in the RAM 104 to implement total control or a function of the computer system 100.

The computer system 100 according to the embodiment can implement the respective functions described hereinafter with the hardware configuration described above.

[Software Configuration]

Figure 3:
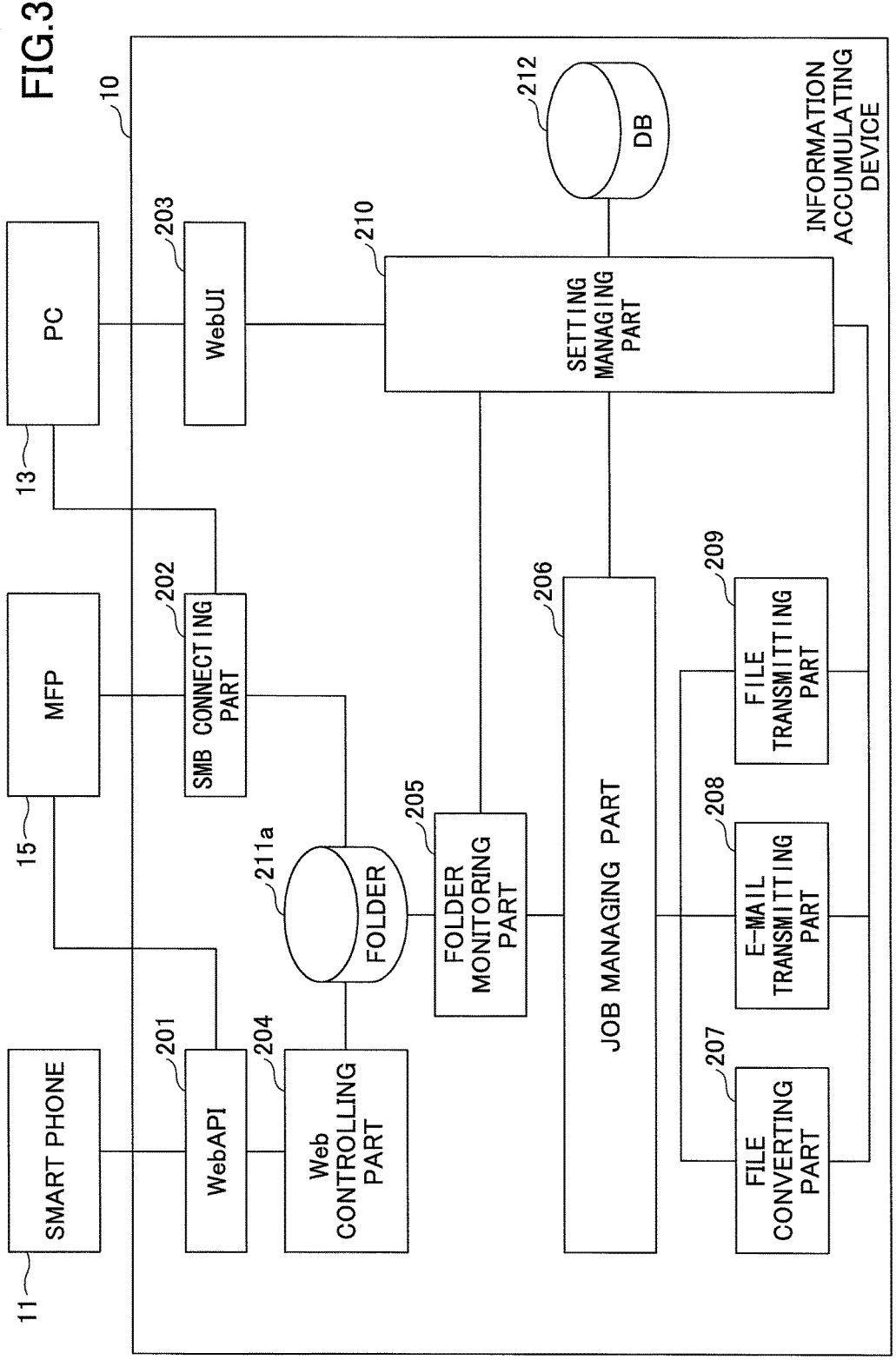
FIG. 3 is a diagram for illustrating an example of a process block of an information storing device according to the embodiment.

The information storing device 10 according to the embodiment is implemented by a process block illustrated in FIG. 3, for example. FIG. 3 is a diagram for illustrating an example of a process block of the information storing device 10 according to the embodiment. The information storing device 10 executes programs to implement a WebAPI 201, a SMB connecting part 202, a WebUI 203, a Web controlling part 204, a folder monitoring part 205, a job managing part 206, a file converting part 207, an e-mail transmitting part 208, a file transmitting part 209, a setting managing part 210, a folder 211*a*, and a DB 212.

The information storing device 10 is connected to devices such as the smart phone 11, the tablet terminal 12, the PC 13, the digital camera 14, the MFP 15, the network printer 16 and the network projector 17 via the network N1, as illustrated in FIG. 1. In FIG. 3, the smart phone 11, the PC 13 and the MFP 15 are illustrated as an example.

The WebAPI (Application Programming Interface) 201 enables reception of folder list acquiring demands from the smart phone 11 and the MFP 15 as well as file transmission (file uploading). The WebAPI 201 is available via the network N1. The WebAPI 201 accepts an HTTP request and performs an HTTP response.

The WebAPI 201 is a predefined interface provided for receiving the request (demand) from the smart phone 11 and the MFP 15, and includes functions, classes or the like, for example.

Further, the WebAPI 201 of the information storing device 10 can be provided as a SDK (Software Development Kit) to developers of applications that are installed in the smart phone 11, etc. The developers of applications can develop the applications using the SDK. The SDK can be provided to a third party vender other than a provider of the information storing device 10. The third vender can develop the applications using the provided SDK. The applications developed using the SDK can be installed in the information processing device such as the smart phone 11.

By providing the WebAPI 201 of the information storing device 10 as a SDK, not only the applications developed by the provider of the information storing device 10 but also the applications developed by the third vender can be installed in the information processing device such as the smart phone 11.

The SMB connecting part 202 enables folder browsing from the PC 13 via the network N1. The SMB connecting part 202 places the folder 211 in the public domain on the network N1 with a SMB protocol. The user can use the PC 13 to access the folder 211*a* that is placed in the public domain on the network N1.

The WebUI 203 displays a setting screen for changing a workflow setting (a file conversion format, an e-mail transmission destination, etc.) and an apparatus setting. The user can display WebUI 203 from the Web browser of the PC 13, for example. The user can change the workflow setting and the apparatus setting via the setting screen using the Web browser. The Web controlling part 204 performs processing in response to the request (HTTP request) accepted via the WebAPI 201.

The folder monitoring part 205 monitors various types of file manipulation such as generating new files to be stored in the folder 211*a*, updating the files, deleting the files and renaming the files. The job managing part 206 manages execution order of works (tasks or jobs) set in the workflow. The file converting part 207, the e-mail transmitting part 208 and the file transmitting part 209 are examples of a module that executes respective works.

For example, the file converting part 207 performs a format conversion of a file. The e-mail transmitting part 208 performs an e-mail transmission to a designated destination. The file transmitting part 209 stores a file in a designated folder. In FIG. 3, three works are illustrated as an example; however, any function can be set as a work, as long as it provides users with any merit.

The setting managing part 210 connects to the DB 212 to update and retrieve values of the DB 212. The DB 212 stores values of the workflow setting and the apparatus setting set by the user. The folder 211*a* stores a file. The file stored in the folder 211*a* includes an image file, an application file, a document file, etc. It is noted that the file stored in the folder 211*a* is an embodiment of data.

The information storing device 10 illustrated in FIG. 3 includes the WebAPI 201 and the SMB connecting part 202 as interfaces with respect to the folder 211*a*. Thus, even the information processing device such as the smart phone 11, which cannot utilize the SMB protocol, can access the folder 211*a* by utilizing the WebAPI 201.

Because the information processing device such as the smart phone 11 can perform the folder list acquiring demand and the file transmission (file uploading) with respect to the folder 211*a* by utilizing the WebAPI 201, the information processing device can utilize a workflow folder 211.

[Details of Processing]

In the following, processing of the cooperative processing system 1 according to the embodiment is described in detail.

Figure 4:
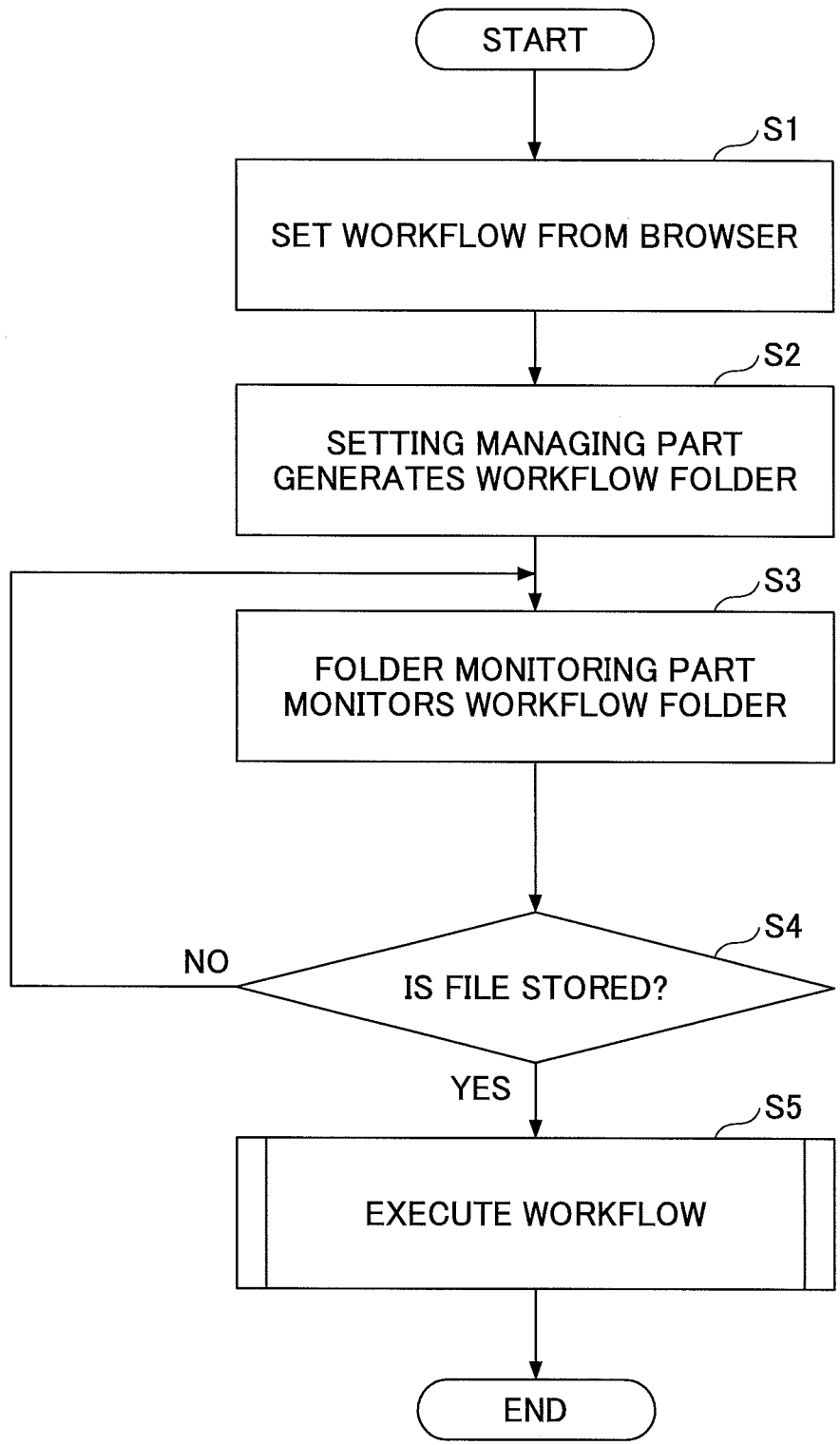
FIG. 4 is a flowchart for illustrating an example of a process procedure of the cooperative processing system according to the embodiment.

FIG. 4 is a flowchart for illustrating an example of a process procedure of the cooperative processing system according to the embodiment. In step S1, a user sets in the cooperative processing system 1 contents of workflow in advance before performing the workflow. The WebAPI 201 is used to set the workflow. The WebUI 203 can be displayed via the Web browser on the PC 13, etc.

The contents of the workflow setting include a workflow name, a file conversion format necessary at the time of the format conversion of the file stored in the workflow folder 211, a file destination to which the file is to be transmitted, an e-mail transmission destination, etc. It is noted that the file conversion format includes a PDF, a text attached PDF, JPEG, etc.

In step S2, the setting managing part 210 stores in the DB 212 the values of the workflow setting that has been set by the user using the WebUI 203. If the values of the workflow setting are stored successfully in the DB 212, the setting managing part 210 generates a folder (workflow folder 211) 211*a* with a workflow name set by the user, and places the generated workflow folder 211 in the public domain as a shared folder.

In step S3, the folder monitoring part 205 starts to monitor the workflow folder 211. At that time, the file manipulation with respect to the workflow folder 211 to be monitored is the generation of a new file. When the processes in steps S1 through S3 are completed, setting the workflow is completed. After the completion of the workflow setting, the user can actually perform the workflow.

In step S4, the folder monitoring part 205 determines whether the file is stored in the workflow folder 211. If the file is not stored in the workflow folder 211, the folder monitoring part 205 returns to step S3 and thus the folder monitoring part 205 continues monitoring.

If the folder monitoring part 205 detects that the file is stored in the workflow folder 211, the folder monitoring part 205 goes to step S5 and waits for a predetermined time. The folder monitoring part 205 executes the workflow described hereinafter after a lapse of the predetermined time.

It is noted that the reason why the folder monitoring part 205 waits for the predetermined time is because if the execution of the workflow is started immediately after the user stores the file in the workflow folder 211, the user cannot make a cancellation in the case where the user erroneously stores the file in the workflow folder 211. By waiting the predetermined time, the user can make a cancellation within the predetermined time by deleting the file in the workflow folder 211 in the case where the user has erroneously stored the file in the workflow folder 211.

Figure 5:
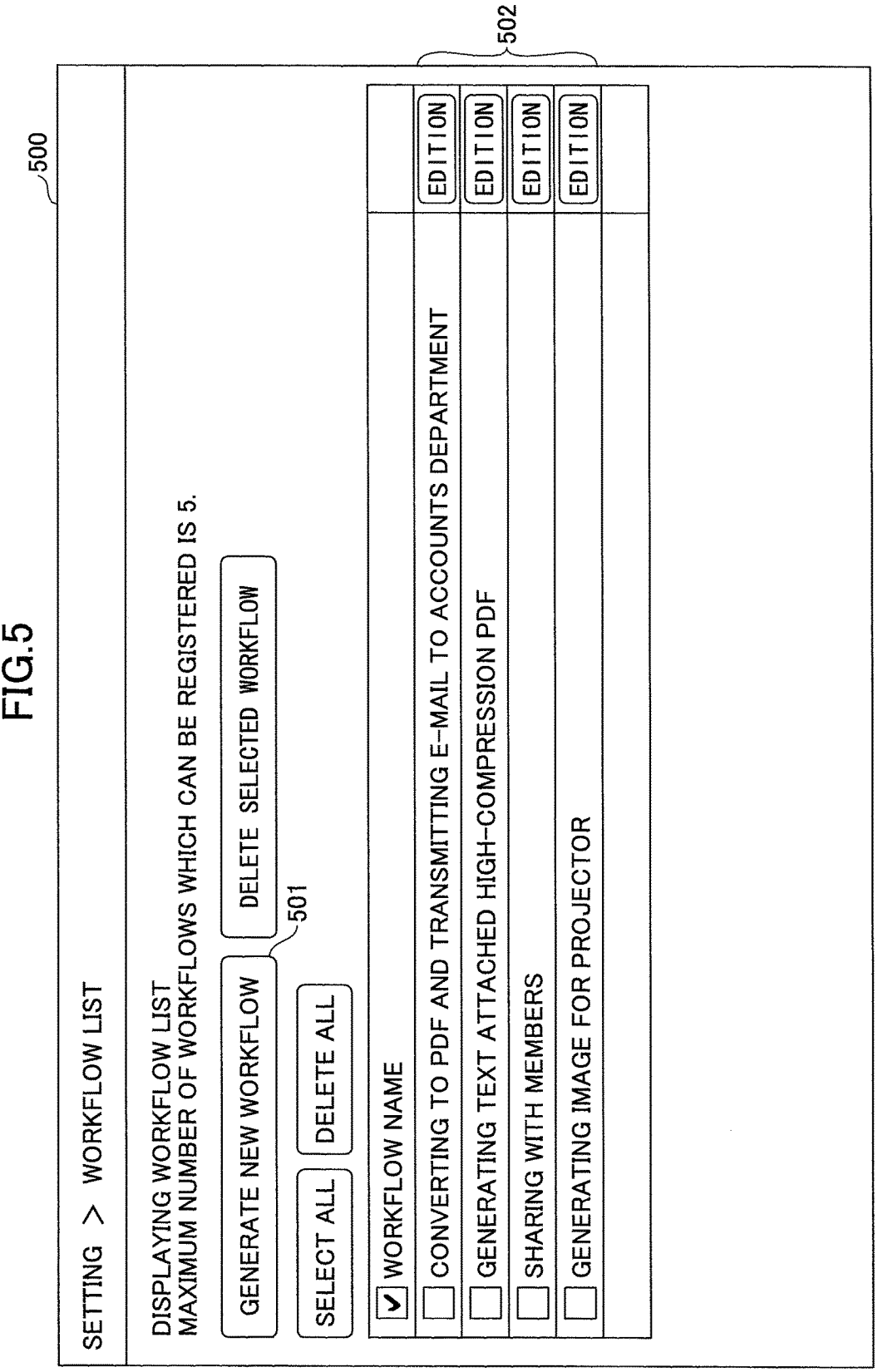
FIG. 5 is an image diagram for illustrating an example of a workflow listing screen.

In step S1, such a workflow list screen 500 as illustrated in FIG. 5 is displayed in the Web browser on the PC 13, etc. FIG. 5 is an image diagram for illustrating an example of a workflow listing screen. The workflow list screen 500 illustrated in FIG. 5 includes "generate new workflow" button 501.

The user can display such a workflow setting screen 600 illustrated in FIG. 6 in the Web browser by pressing the "generate new workflow" button 501 or edition buttons 502. FIG. 6 is an image diagram for illustrating an example of a workflow setting screen.

According to the workflow setting screen illustrated in FIG. 6, a workflow name, a file conversion format necessary at the time of the format conversion of the file stored in the workflow folder 211, an original document keeping intention whether to keep the original document, a file destination to which the file is to be transmitted, an e-mail transmission destination, etc., can be set.

In step S2, the setting managing part 210 stores the values of the workflow setting set in the workflow setting screen 600 illustrated in FIG. 6 in the DB 212 as illustrated in FIG. 7, for example. FIG. 7 is a diagram for illustrating an example of a configuration of values of the workflow setting stored in the DB 212.

According to the DB 212 illustrated in FIG. 7, the values of the workflow setting set in the workflow setting screen 600 are stored in a workflow setting table 701, a file destination table 702 and an e-mail transmission destination table 703, for example. The workflow setting table 701 includes workflow IDs, users, workflow names, file conversion formats, original document keeping intentions, etc., as data items. The file destination table 702 includes workflow IDs, users, destination names and file transmission destination as data items. The e-mail transmission destination table 703 includes workflow IDs, users, destination names and e-mail transmission destination as data items.

It is noted that the workflow setting table 701, the file destination table 702 and the e-mail transmission destination table 703 are associated with workflow IDs, respectively. For example, with respect to the workflow of the workflow ID "7tge983fsv" in FIG. 7, one file destination and two e-mail transmission destinations are set.

Figure 8:
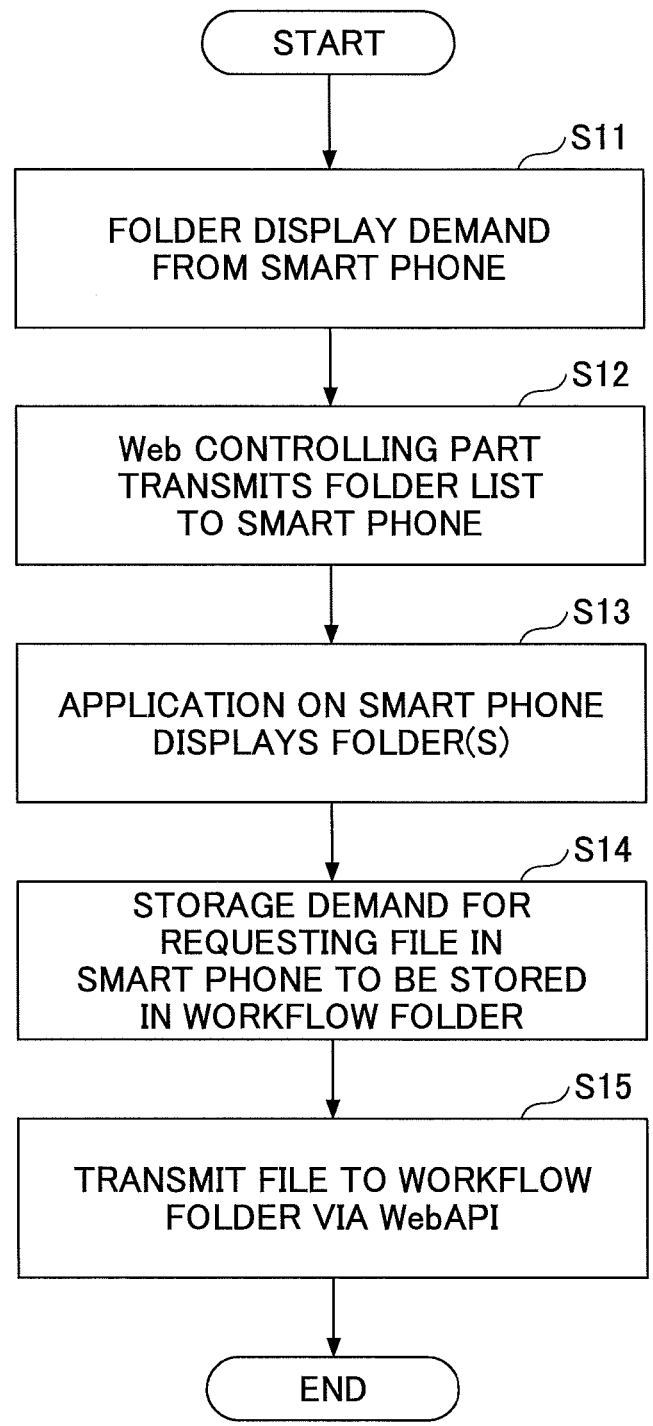
FIG. 8 is a flowchart for illustrating an example of a process for storing a file in a workflow folder.

FIG. 8 is a flowchart for illustrating an example of a process for storing a file in the workflow folder. In step S11, the user operates the smart phone 11 to select a folder list displaying process.

When the folder list displaying process is selected by the user, the smart phone 11 transmits the folder list acquiring demand to the information storing device 10 with the HTTP request (GET). The Web controlling part 204 of the information storing device 10 accepts the folder list acquiring demand via the WebAPI 201. The Web controlling part 204 generates a folder list. FIG. 9 is a diagram for explaining an example of an HTTP request that the information storing device accepts. FIG. 9 illustrates an example of a GET that is placed in the public domain by the information storing device 10.

In step S12, the Web controlling part 204 transmits the generated folder list to the smart phone 11 with such a HTTP response as illustrated in FIG. 10. FIG. 10 is a diagram for illustrating an example of a configuration of a response for the folder list acquiring demand. The response illustrated in FIG. 10 has a JSON (JavaScript Object Notation) format; however, other formats may be used as long as the folder list can be displayed on the smart phone 11.

In step 13, the application installed in the smart phone 11 displays, based on the response for the folder list acquiring demand illustrated in FIG. 10, the folder and file that are placed in the public domain by the information storing device 10. As a result of repeating the processes of steps S11 through S13, such screens as illustrated in FIGS. 11 and 12 are displayed on the smart phone 11.

Figure 11:
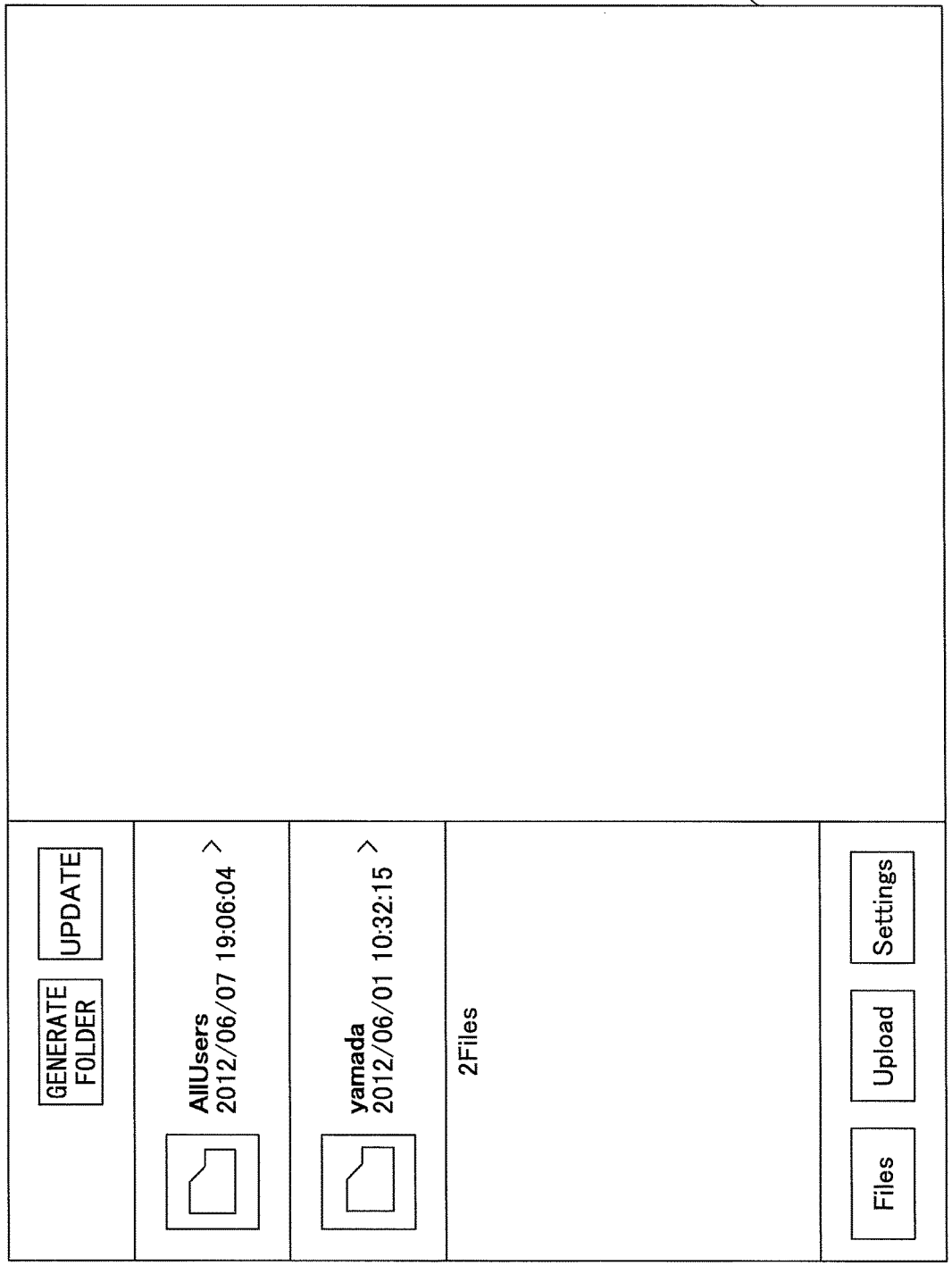
FIG. 11 is an image diagram for illustrating an example of an IT folder selecting screen.

FIG. 11 is an image diagram for illustrating an example of an IT folder selecting screen. According to the IT folder selecting screen 1000, "AllUsers" or "yamada" can be selected as an IT folder.

Figure 12:
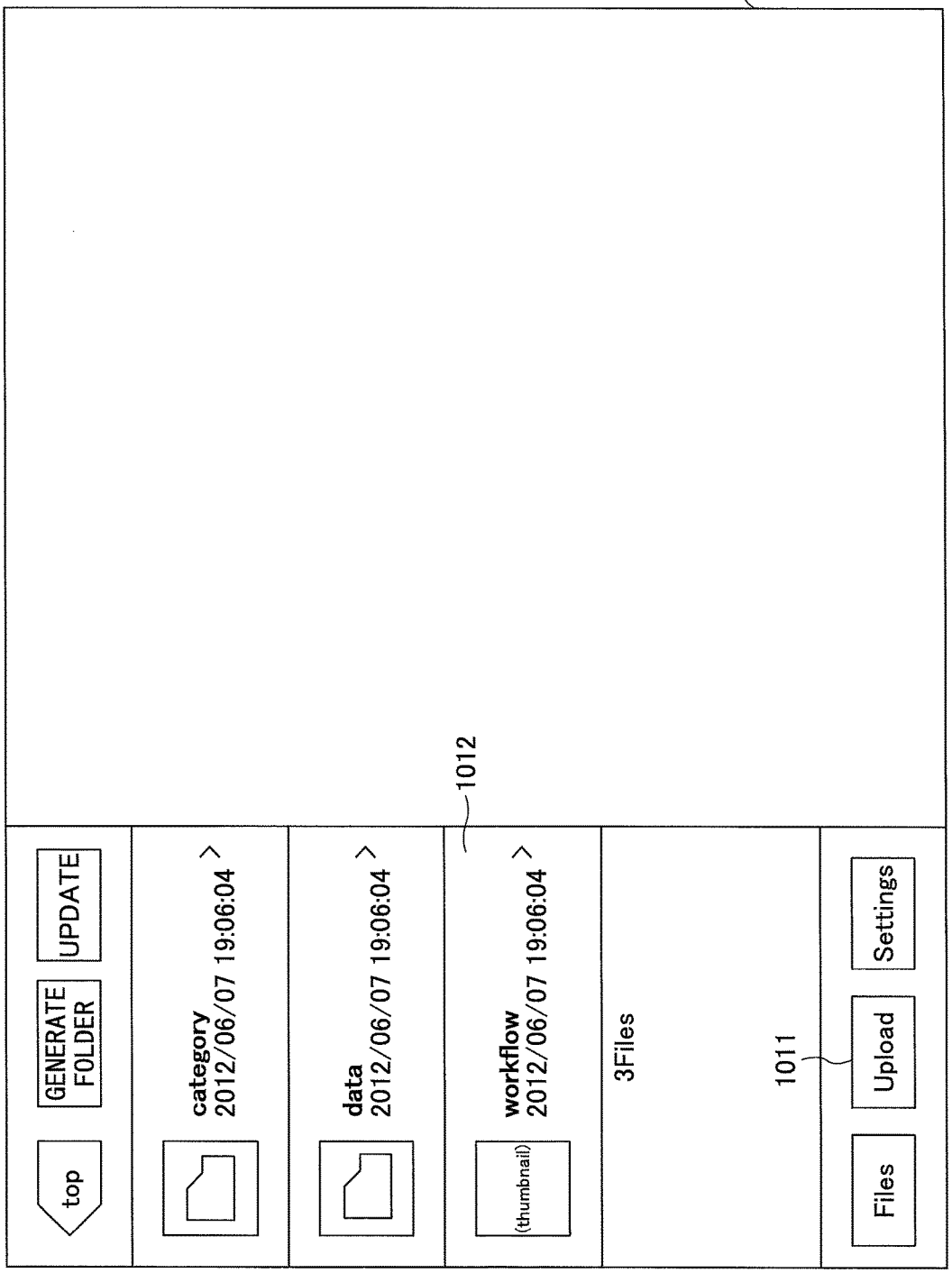
FIG. 12 is an image diagram for illustrating an example of a folder displaying screen.

FIG. 12 is an image diagram for illustrating an example of a folder displaying screen. The folder displaying screen 1010 illustrated in FIG. 12 is displayed after the "AllUsers" IT folder is selected in the IT folder selecting screen 1000. According to the folder displaying screen 1010 illustrated in FIG. 12, "category", "data" and "workflow" are displayed as folders. The ""workflow" 1012 illustrated in FIG. 12 corresponds to the workflow folder 211.

Figure 13:
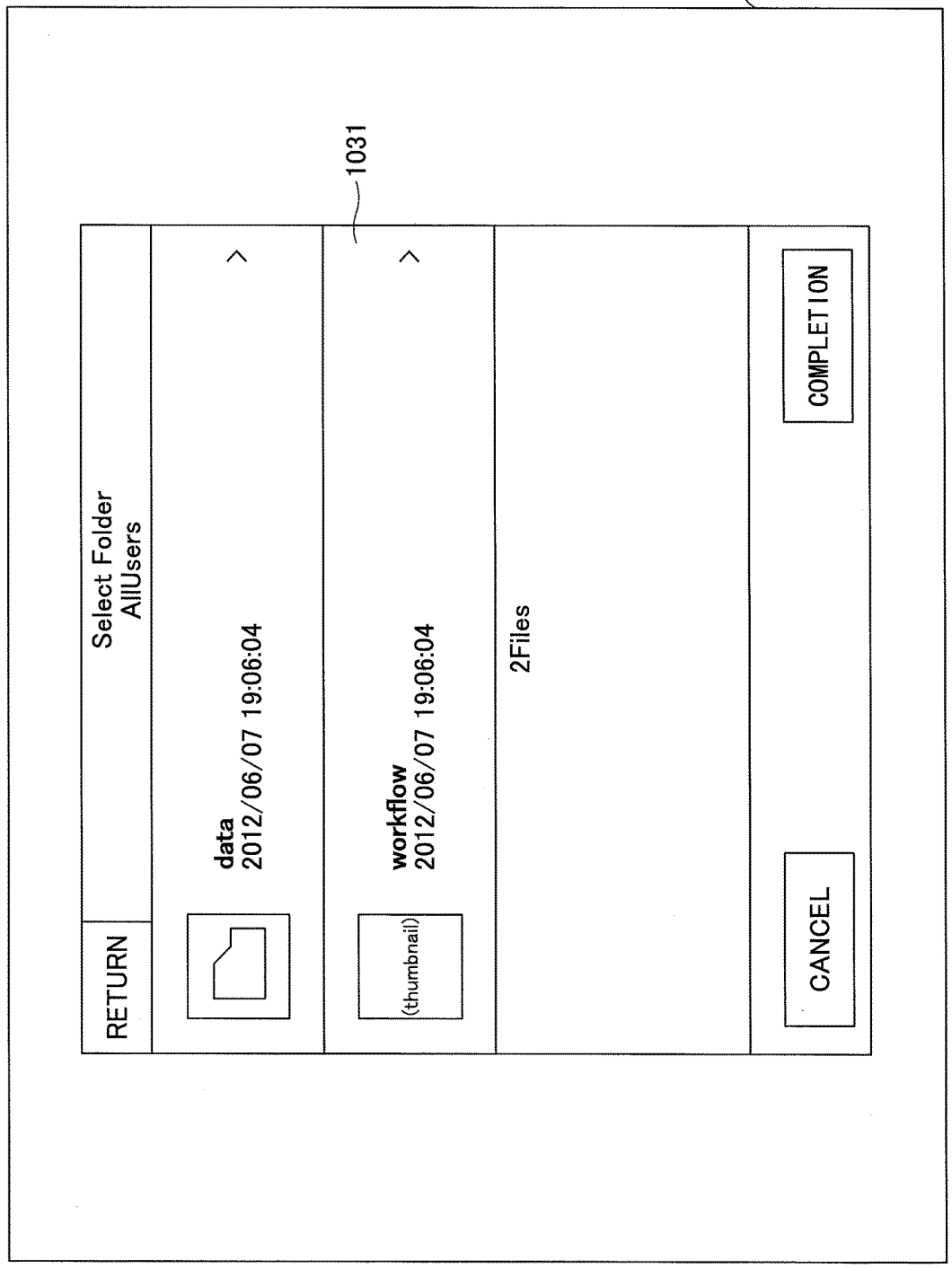
FIG. 13 is an image diagram for illustrating an example of a folder selecting screen.

In step S14, if "Upload" button 1011 is pressed in the folder displaying screen 1010 illustrated in FIG. 12, the smart phone 11 displays a folder selecting screen 1030 illustrated in FIG. 13. FIG. 13 is an image diagram for illustrating an example of a folder selecting screen.

Figure 14:
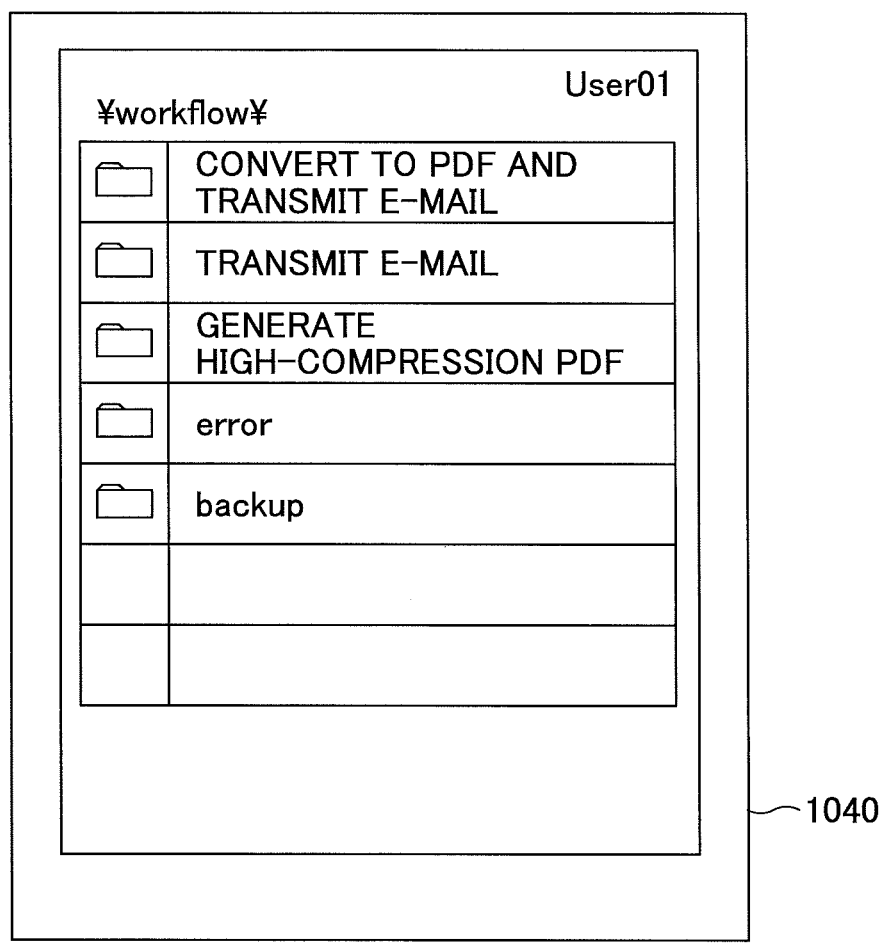
FIG. 14 is an image diagram for illustrating an example of a workflow selecting screen.

When the user selects "workflow" 1031 in the folder selecting screen 1030 illustrated in FIG. 13, the application installed in the smart phone 11 displays such a workflow selecting screen 1040 as illustrated in FIG. 14.

FIG. 14 is an image diagram for illustrating an example of a workflow selecting screen. According to the workflow selecting screen 1040 illustrated in FIG. 14, a plurality of workflow folders 211 are displayed with corresponding workflow names. By selecting the workflow folder 211 that the user wants to perform in the workflow selecting screen 1040 illustrated in FIG. 14, the user can select the workflow folder 211 as an upload destination folder.

The user makes a file uploading demand to the workflow folder 211 selected as the upload destination folder in order to store the files stored in the smart phone 11 in the workflow folder 211 selected as the upload destination folder.

When the file uploading demand is made by the user, in step S15 the smart phone 11 transmits the file uploading demand to the information storing device 10 with the HTTP request (POST). The Web controlling part 204 of the information storing device 10 accepts the file uploading demand via the WebAPI 201. The Web controlling part 204 stores the file in the upload destination workflow folder 211. FIG. 15 is a diagram for explaining an example of an HTTP request that the information storing device accepts. FIG. 15 illustrates an example of a POST that is placed in the public domain by the information storing device 10.

Figure 16:
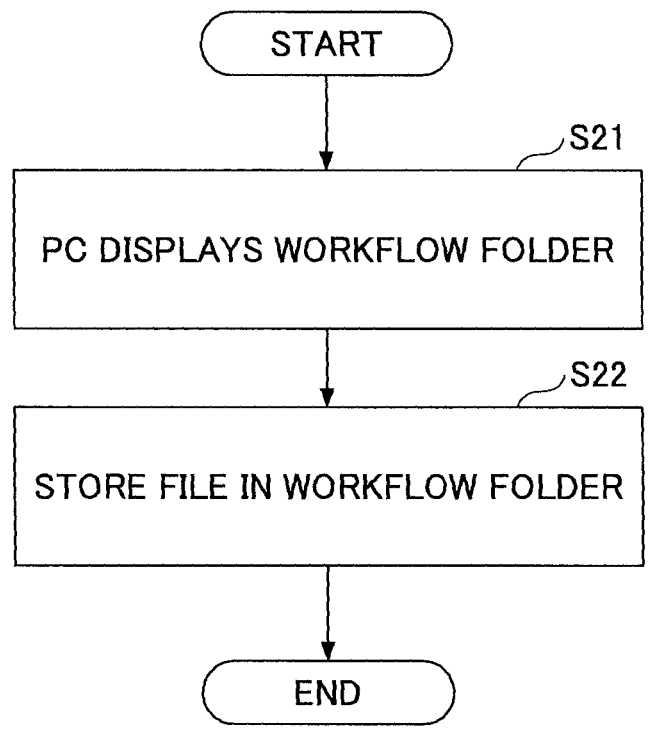
FIG. 16 is a flowchart for illustrating another example of a process for storing a file in a workflow folder.

It is noted that the storage of the file in the workflow folder 211 can be performed from the PC 13 via the SMB connecting part 202 as well as from the smart phone 11 via the WebAPI 201. FIG. 16 is a flowchart for illustrating another example of a process for storing a file in a workflow folder.

In step S21, the user operates the PC 13 to select a folder list displaying process of the information storing device 10. The PC 13 utilizes the SMB protocol of the network N1 to display the workflow folder 211 of the information storing device 10.

In step S22, the user operates the PC 13 to select the workflow folder 211 which the user wants to perform. The PC 13 utilizes the SMB protocol of the network N1 to store the file in the workflow folder 211 selected by the user.

Figure 17:
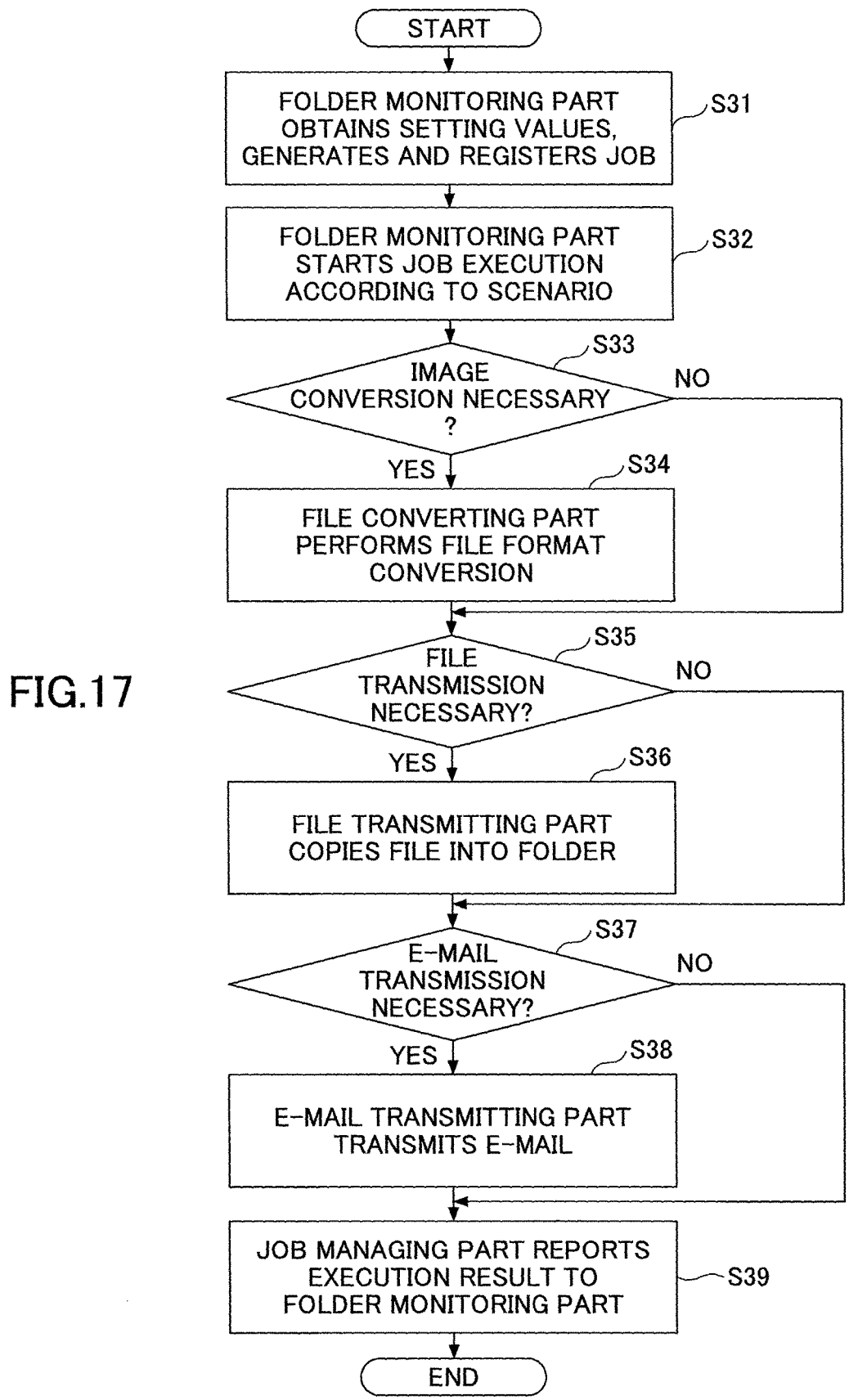
FIG. 17 is a flowchart for illustrating an example of a process of a workflow execution.

FIG. 17 is a flowchart for illustrating an example of a process of a workflow execution. FIG. 17 illustrates the process of step S5 illustrated in FIG. 4 in detail. When the folder monitoring part 205 detects that the file is stored in the workflow folder 211, the folder monitoring part 205 starts a process of step S31.

In step S31, the folder monitoring part 205 obtained the values of the workflow setting from the setting managing part 210. The folder monitoring part 205 determines the work to be actually performed among the obtained values of the workflow setting. Then, the folder monitoring part 205 selects a scenario definition (what is to be executed, and execution order) suited for the work to generate a job, and registers the job in the job managing part 206. Further, in step S32, the job managing part 206 starts the execution of the job according to the scenario definition of the registered job.

In step S33, the job managing part 206 determines whether an image conversion is necessary in executing the job. If the job managing part 206 determines that the image conversion is necessary, the job managing part 206 causes the file converting part 207 to convert the file format in step S34. If the job managing part 206 determines that the image conversion is not necessary, the job managing part 206 skips the process of step S34.

In step S35, the job managing part 206 determines whether a file transmission is necessary in executing the job. If the file transmission is necessary, the job managing part 206 causes the file transmitting part 209 to store the file in the designated folder in step S36. If the file transmission is not necessary, the job managing part 206 skips the process of step S36.

In step S37, the job managing part 206 determines whether an e-mail transmission is necessary in executing the job. If the e-mail transmission is necessary, the job managing part 206 causes the e-mail transmitting part 208 to transmit an e-mail to the designated destination in step S38. If the e-mail transmission is not necessary, the job managing part 206 skips the process of step S38.

After the job managing part 206 completes all the works, the job managing part 206 goes to step S39 in which the job managing part 206 reports the execution result of the workflow to the folder monitoring part 205. It is noted that processing of the folder monitoring part 205 when the execution result of the workflow is reported to the folder monitoring part 205 described hereinafter.

Figure 18:
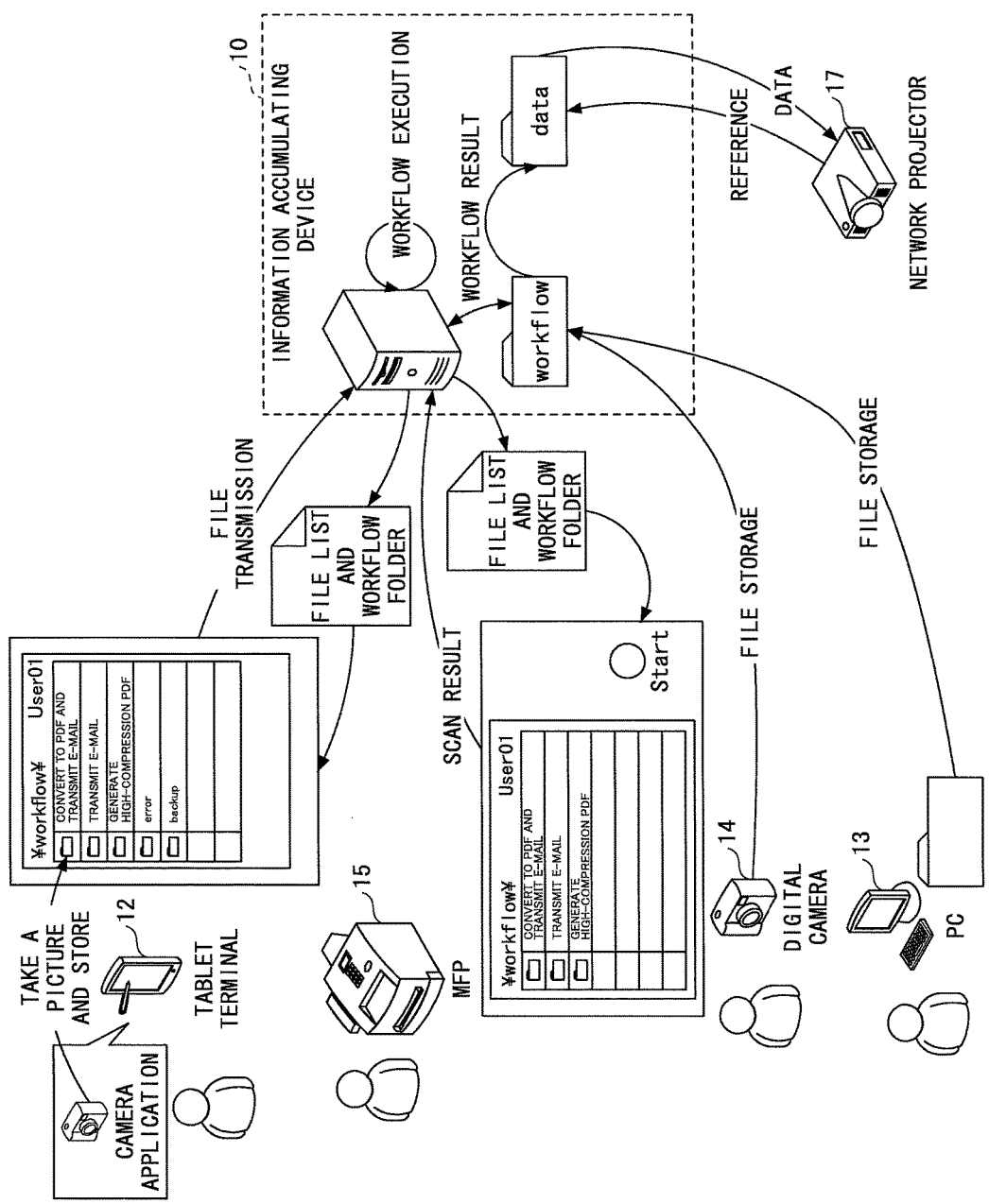
FIG. 18 is an image diagram for illustrating a usage example of the workflow.

FIG. 18 is an image diagram for illustrating a usage example of the workflow. The usage example of the workflow is such that the user executes the workflow using the tablet terminal 12. The user uses a camera application installed in the tablet terminal 12 to capture contents of a white board, which have been written during the meeting, to store them as a picture. Here, it is assumed that the contents stored as the picture are attached to an e-mail to be distributed to attendants of the meeting. It is noted that such a content that defines that the file is to be transmitted by the e-mail to the attendants of the meeting is set in advance in the workflow "converting to PDF and transmitting e-mail".

After the meeting, the user uses the tablet terminal 12 to display the workflow. The user launches the camera application of the tablet terminal 12 to capture the picture of the white board. The user selects, as the storage destination of the picture data, the workflow folder 211 of the information storing device 10 in which the workflow "converting to PDF and transmitting e-mail" is set to store the picture data (file) in the workflow folder 211.

The folder monitoring part 205 detects that the file is stored in the workflow folder 211 and executes the workflow "converting to PDF and transmitting e-mail". Then, the job managing part 206 causes the file converting part 207 to convert the file (image file) stored in the workflow folder 211 into the PDF file. Further, the job managing part 206 causes the e-mail transmitting part 208 to perform the e-mail transmit of the PDF file to the predefined e-mail transmission destinations of the attendants of the meeting.

In this way, the user can share a picture captured by the tablet terminal 12 between the attendants of the meeting, by utilizing the workflow folder 211 of the information storing device 10 in which the workflow "converting to PDF and transmitting e-mail" is set. The user can share the contents of the white board between the attendants of the meeting without taking such a procedure that includes user's taking the picture with the digital camera 14, reading the captured picture data into the PC and then creating the e-mail to transmit the picture data from the PC 13.

Further, another usage example of the workflow is such that the user uses the PC 13, the digital camera 14 or the MFP 15 to execute the workflow. The user performs the processing based on the workflow setting by storing, in the workflow folder 211, the scan data obtained by using the scan function of the MFP 15, the picture data obtained by using the picture function of the digital camera 14, or the data stored in the PC 13. Further, another usage example of the workflow may be such that the network projector 17 is caused to project the result of the processing based on the workflow setting.

Figure 19:
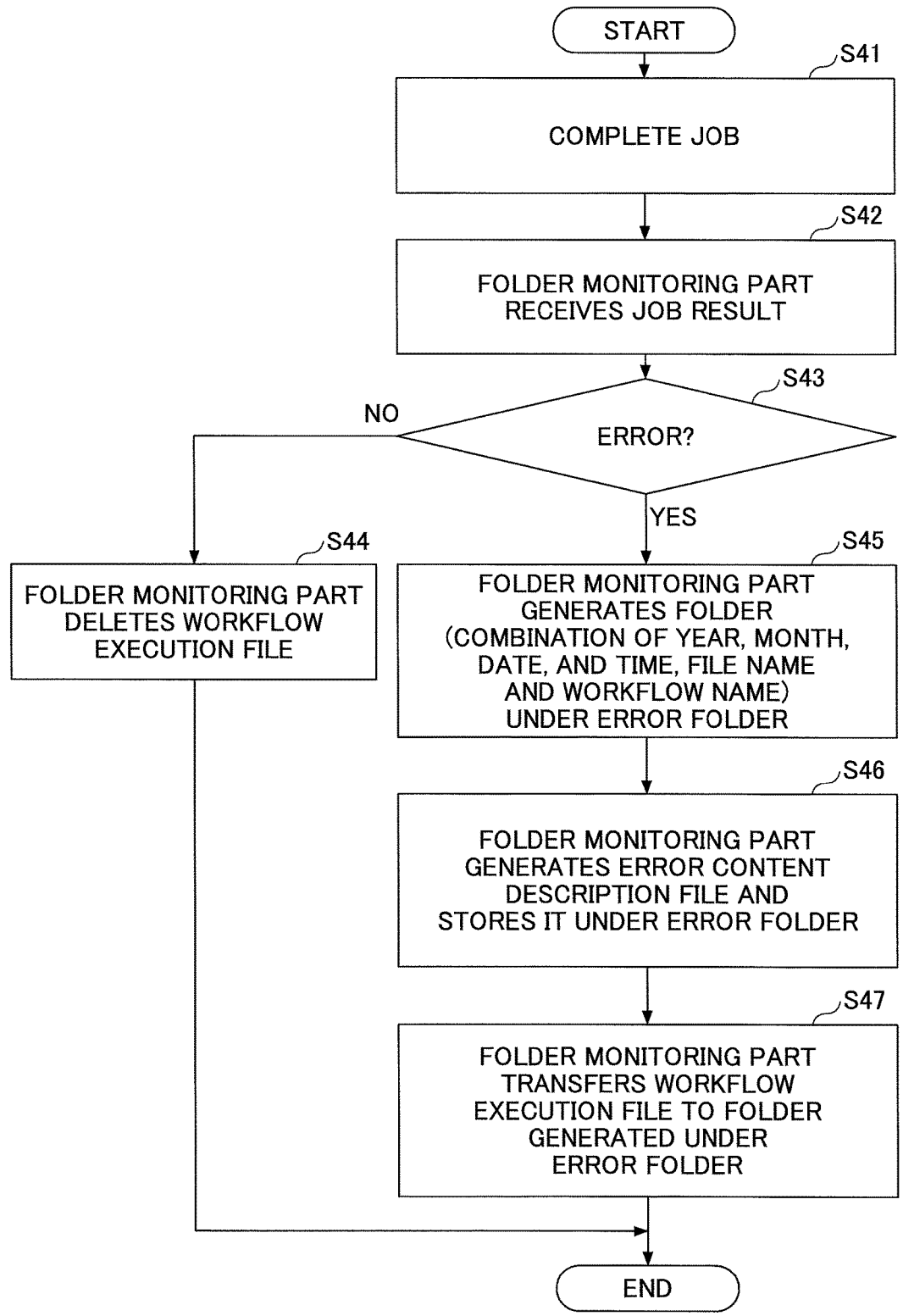
FIG. 19 is a flowchart for illustrating an example of a process of a folder monitoring part that is informed of the execution result of the workflow.
Figure 20:
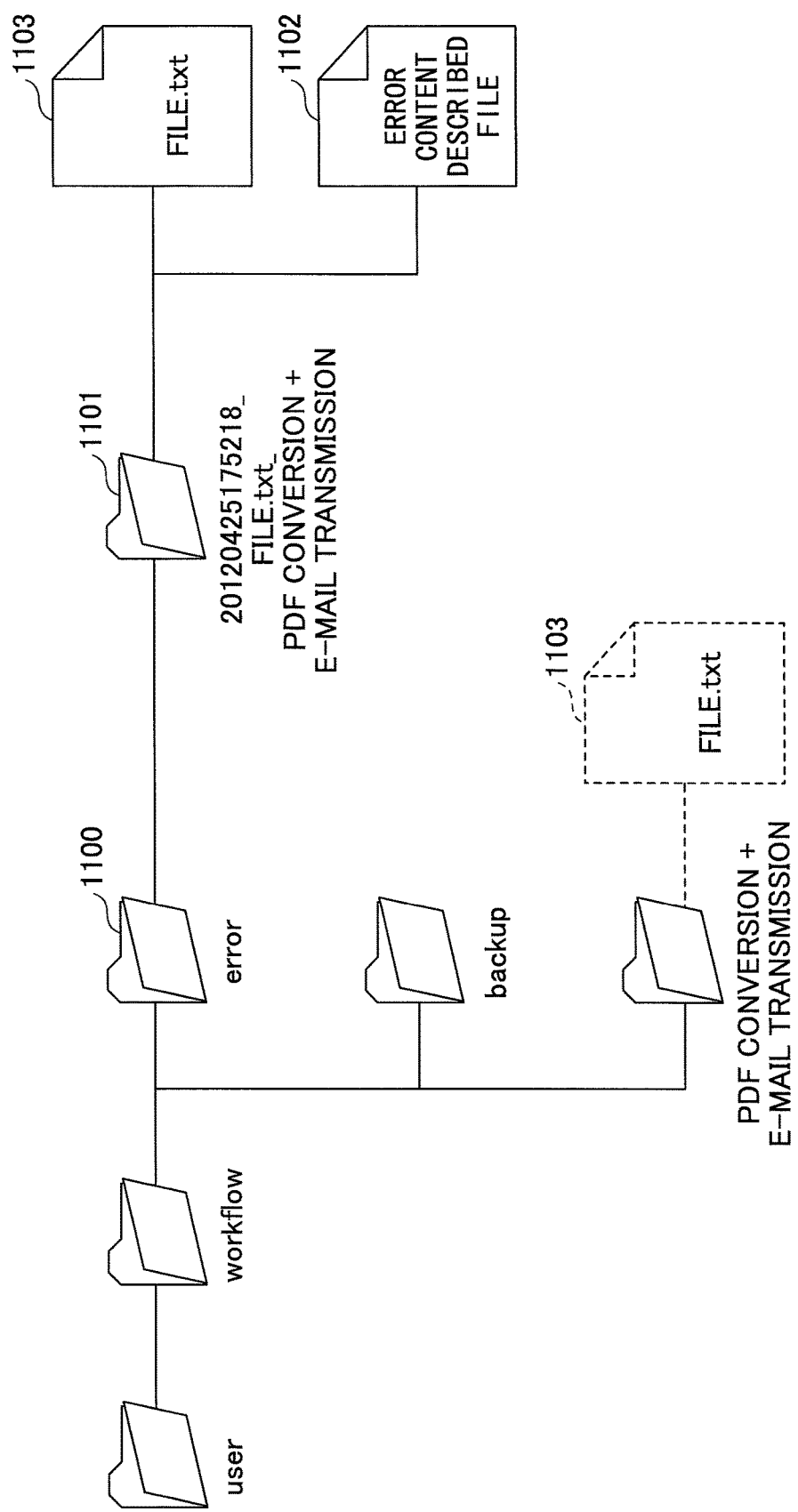
FIG. 20 is a diagram for illustrating an example of a configuration of a folder.

When the folder monitoring part 205 is reported the execution result of the workflow, the folder monitoring part 205 performs a process illustrated in FIG. 19, for example. FIG. 19 is a flowchart for illustrating an example of a process of a folder monitoring part which is informed of the execution result of the work flow. FIG. 20 is a diagram for illustrating an example of a configuration of a folder.

In step S41, the job managing part 206 reports the execution result of the job to the folder monitoring part 205 after completing the job of the workflow. Then, in step S42, the folder monitoring part 205 receives the execution result of the job from the job managing part 206.

In step S43, the folder monitoring part 205 determines, based on the execution result of the job, whether an error occurred at the time of the execution of the workflow. If an error didn't occur at the time of the execution of the workflow, the folder monitoring part 205 goes to step S44 in which the folder monitoring part 205 deletes a workflow execution file 1103 and ends the process routine.

If an error occurred at the time of the execution of the workflow, the folder monitoring part 205 goes to step S45 in which the folder monitoring part 205 generates a folder 1101, which has a name combined by year, month, date, and time of the error occurrence, a name of the file with which the error occurred and a workflow name which was executed, under an "error" folder 1100 illustrated in FIG. 20.

In step S46, the folder monitoring part 205 generates, according to the execution result of the job, a file 1102 in which the content of the error is described, and in step S45 the folder monitoring part 205 stores the generated folder. The content of the error that is described in the file (error content description file) 1102 includes, for example, "there is no transmission destination folder" and "it is not a convertible file format", etc. Then, in step S47, the folder monitoring part 205 transfers the workflow execution file 1103 to the folder 1101 which is generated in step S45, and ends the process.

In this way, the information storing device 10 generates the error content description file 1102 and stores it in the folder 1101. Thus, it is possible to provide the information processing device such as the smart phone 11 with the error content description file 1102 utilizing the WebAPI 201. The user can check the error content description file 1102 without launching the browser installed in the PC 13 to access the WebUI 203 or launching the mailer to receive the e-mail.

Next, a workflow for transmitting and receiving, with the facsimile, the data in the information storing device 10 using the MFP 15 is described. First, a workflow for transmitting the data in the information storing device 10 from the MFP 15 with the facsimile is described.

FIG. 21 is a diagram for illustrating an example of a setting screen 1200 for a facsimile transmission workflow displayed on the smart phone 11. For the item "FAX transmission MFP" is input the Information of the MFP 15 which is used for transmitting the data in the information storing device 10. In a box in FIG. 21 is directly input information for identifying the MFP 15 such as a model number of the MFP 15, an IP address of the MFP 15, etc. Further, the list of the MFPs 15 connected to the information storing device 10 may be obtained by pressing a selection button, and the input may be performed by selecting from the obtained list of the MFPs 15.

Further, the smart phone 11 may read a QR code (registered trademark) or the like displayed in the MFP 15 to obtain the information for identifying the MFP 15, and the input may be implemented by using the obtained information. Instead of the QR code, short distance wireless communication such as Bluetooth (registered trademark) or infrared communication may be used for obtaining the information for identifying the MFP 15.

Information of the destination to which the facsimile is to be transmitted is input for the item "destination". A facsimile number of the destination is directly input in a box in FIG. 21. Further, information in an address book in the smart phone 11, for example, may be referenced by pressing a selection button so that the destination may be set based on the information in the address book. Further, the address book may be stored in the information storing device 10. In this case, the smart phone 11 may obtain the address book so that the user can select the destination.

Information on whether a cover sheet is attached at the time of the facsimile transmission is set for the item "presence or absence of cover sheet". Selecting "OK" after setting all the items causes to generate a facsimile transmission workflow folder.

Figure 22:
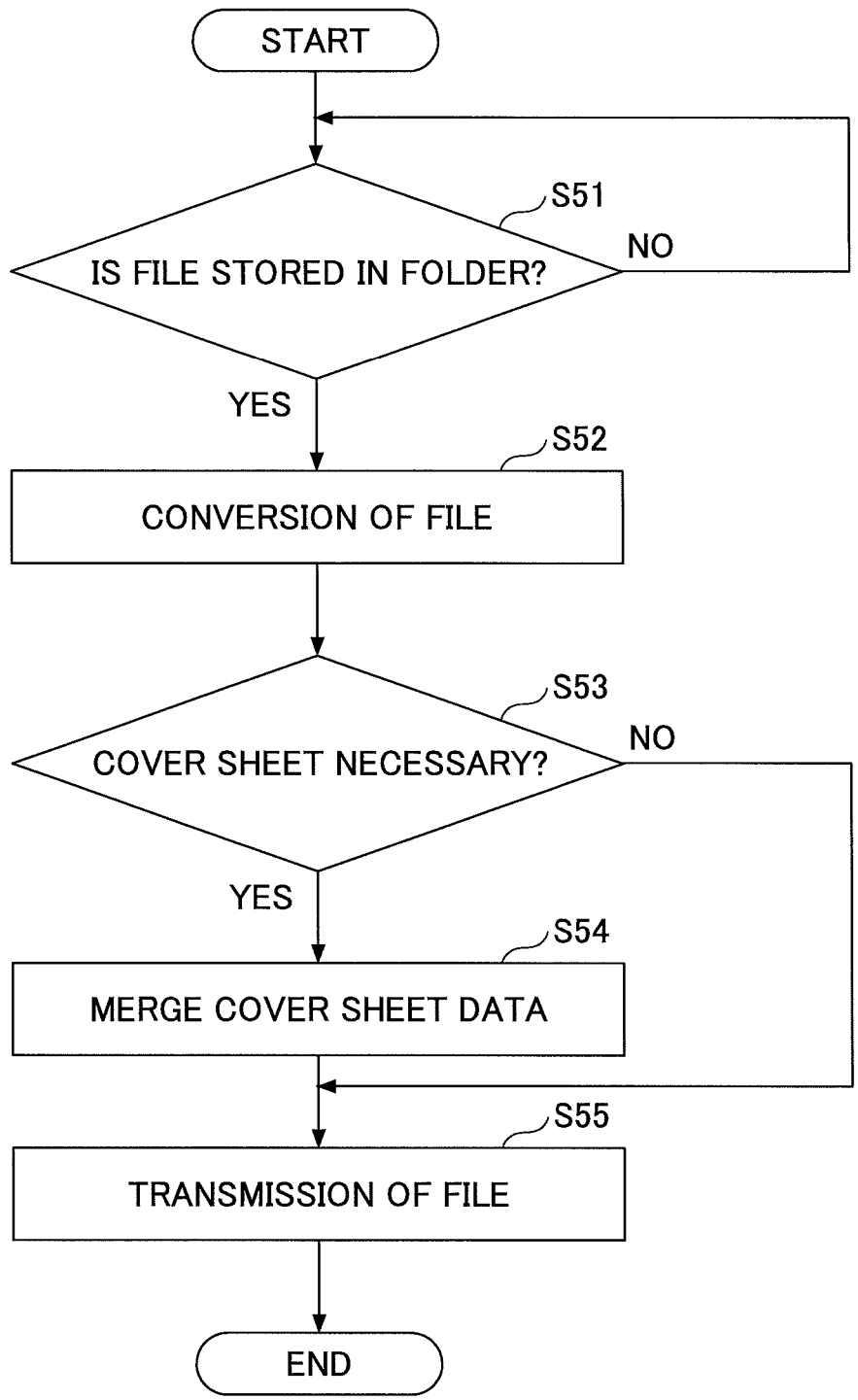
FIG. 22 is a flowchart for illustrating an example of a process for monitoring the folder.

The information storing device 10 monitors the folder as described in a flowchart in FIG. 22 after the facsimile transmission workflow folder is generated.

The folder monitoring part 205 monitors whether the file is stored in the facsimile transmission workflow folder (step S51). The folder monitoring part 205 repeats the process of step S51 until the folder monitoring part 205 detects that the file is stored in the facsimile transmission workflow folder. When the folder monitoring part 205 detects the storage of the file, the file converting part 207 converts the stored file into image data for the facsimile transmission (image data in a TIF format, for example) (step S52).

It is noted that the file to be stored in the facsimile transmission workflow folder is not limited to the file in the information storing device, and may be a file that is stored from the external device such as the tablet terminal as is the case with FIG. 18.

The file converting part 207 determines whether the cover sheet is necessary (step S53). If "cover sheet attached" is selected in the workflow setting screen 1200, the file converting part 207 determines that the cover sheet is necessary and thus newly generates data in which the cover sheet is merged at the leading page of the converted file.

It is noted that the process of step S54 for merging the cover sheet is performed after converting the file in step S52; however, this order is not indispensable. For example, whether the cover sheet is necessary may be determined before converting the file in step S52, and the file may be converted after generating the image data including the cover sheet.

The file generated in step S54 is transmitted to the MFP 15, which is set as "FAX transmission MFP" in FIG. 21, together with a facsimile execution demand (step S55). The facsimile execution demand includes "destination" set in the workflow setting screen.

The MFP 15 which is the FAX transmission MFP transmits the received image data to the MFP 15 at the destination in response to the received facsimile execution demand.

It is noted that in the embodiment described above the facsimile execution demand is transmitted from the information storing device 10 to the MFP 15 which is the FAX transmission MFP; however, this is not indispensable. For example, a facsimile execution demand storage folder for storing the facsimile execution demand may be generated in the information storing device 10, and the MFP 15 which is the FAX transmission MFP may perform polling (monitoring) of the facsimile execution demand storage folder. The information storing device 10 does not transmit the facsimile execution demand to the MFP 15 which is the FAX transmission MFP in step S55, and stores the facsimile execution demand in the facsimile execution demand storage folder. When the facsimile execution demand is stored in the facsimile execution demand storage folder, the MFP 15 which is the FAX transmission MFP may obtain the facsimile execution demand to transmit the received image data to the MFP 15 at the destination in response to the facsimile execution demand.

Figure 23:
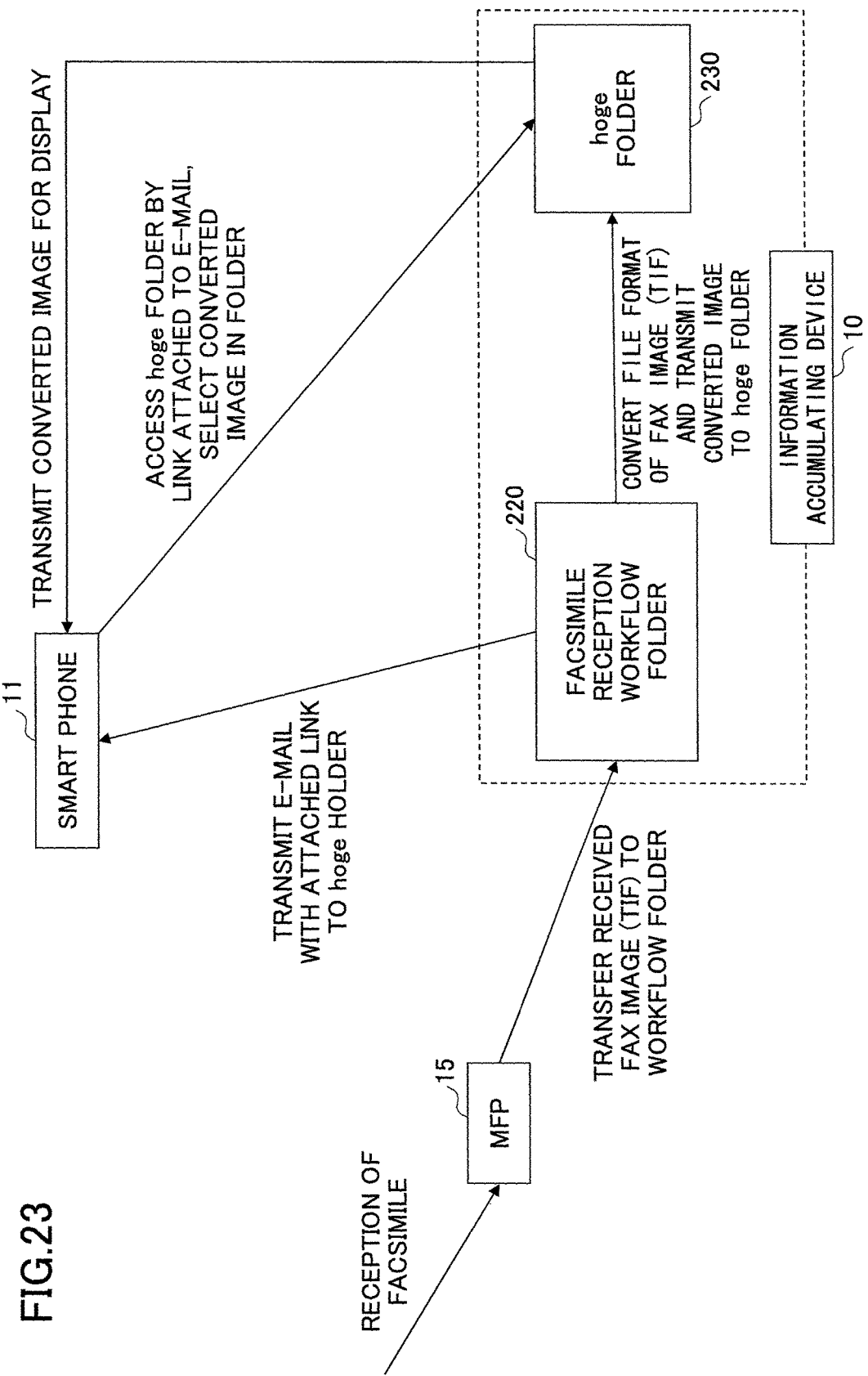
FIG. 23 is a conceptual diagram for illustrating an example of a facsimile transmission in the embodiment.
Figure 24:
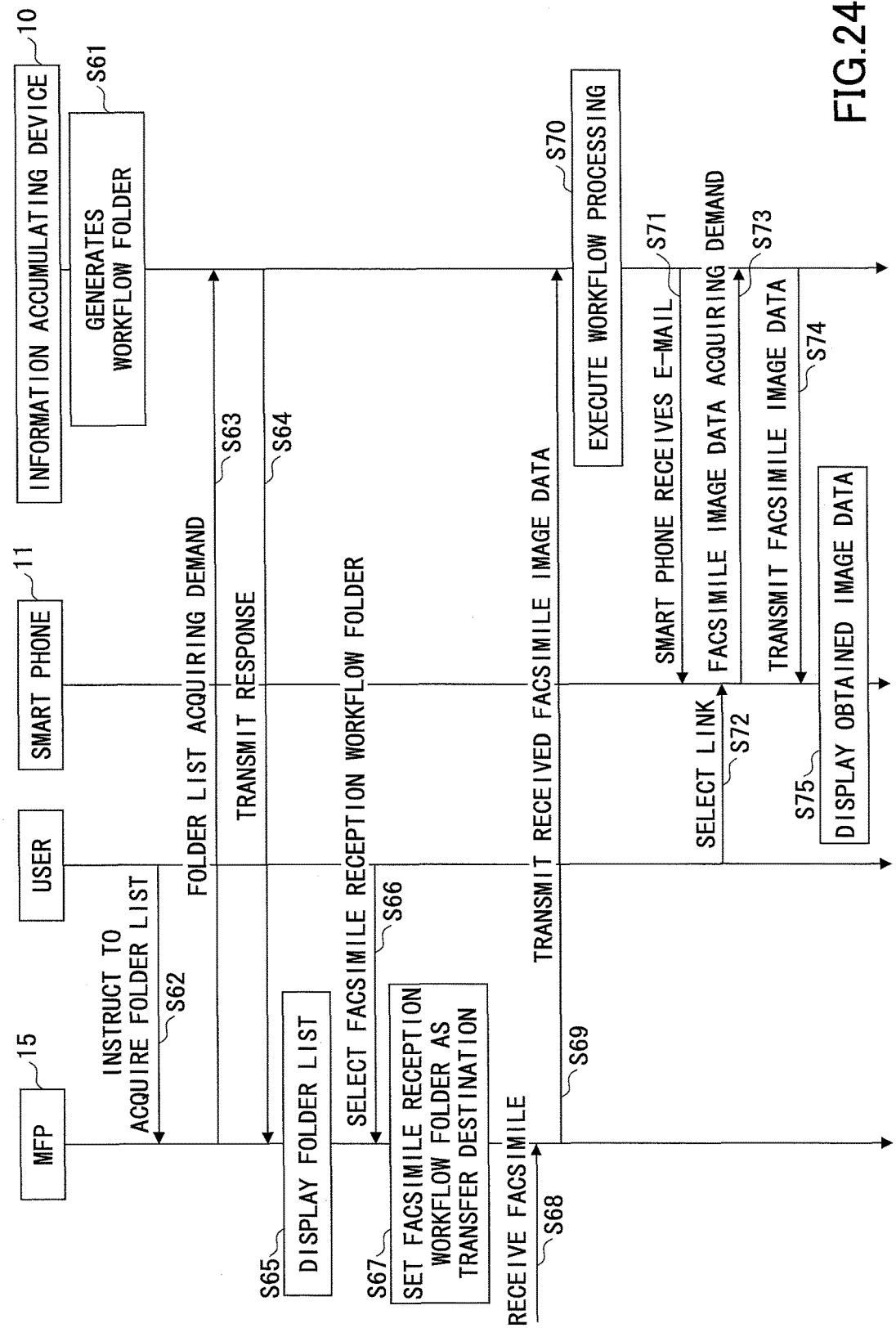
FIG. 24 is a sequence diagram for illustrating an example of details of a process of the facsimile transmission.

Next, a workflow for causing the smart phone 11 to display the image received by the MFP 15 at the destination is described with reference to FIGS. 23 through 25. FIG. 23 is a conceptual diagram for illustrating an example of a facsimile transmission in the embodiment. FIG. 24 is a sequence diagram for illustrating an example of details of a process of the facsimile transmission.

The user sets a file conversion format necessary at the time of the format conversion of the file stored in the workflow folder, a file destination to which the file is to be transmitted, and an e-mail transmission destination, as is the case with the workflow setting screen 600 illustrated in FIG. 6. The information storing device 10 generates a facsimile reception workflow folder 220 based on the setting by the user (step S61). As an example, it is assumed that the file conversion format is set to "PDF", the file destination is set to a Hoge folder 230, and the e-mail transmission destination is set to "abcd@xxxx.co.jp". When the facsimile reception workflow folder 220 is generated, the information storing device 10 starts to monitor the facsimile reception workflow folder 220.

Next, the MFP at the destination selects, as a transfer destination to which the received facsimile is to be transferred, the facsimile reception workflow folder 220 generated in step S61. It is noted that in the embodiment the user sets the transfer destination as an example.

The MFP 15 at the destination receives the folder list acquiring demand from the user (step S62). The MFP 15 at the destination transmits the folder list acquiring demand to the information storing device (step S63). It is noted that the folder list acquiring demand may be transmitted with the HTTP request or the SMB protocol, as described with reference to FIG. 3.

When the information storing device 10 receives the folder list acquiring demand transmitted from the MFP 15 at the destination in step S63, the information storing device 10 transmits a response to the MFP 15 at the destination (step S64).

In step S65, the MFP 15 at the destination displays the folder list in the information storing device 10 based on the response transmitted from the information storing device 10 in step S64.

The MFP 15 at the destination receives the selection of the facsimile reception workflow folder 220 from the user (step S66). The MFP 15 at the destination sets the facsimile reception workflow folder 220 as a transfer folder of the facsimile (step S67).

After the transfer folder of the facsimile is set in step S67, the MFP 15 at the destination receives the facsimile (step S68). The MFP 15 at the destination transmits, based on the transfer folder set in step S67, facsimile image data (in a TIF format, for example) received in step S68 to the information storing device 10 to store the facsimile image data in the facsimile reception workflow folder 220 (step S69). The transmission of the facsimile image data may be implemented by the HTTP request or the SMB protocol.

When the information storing device 10 detects that the facsimile image data is stored in the facsimile reception workflow folder 220, the information storing device 10 performs the process in FIG. 17 based on the setting of the workflow set in step S61 (step S70). In this case, since the image conversion is necessary in step S33 in FIG. 17, the file format of the facsimile image data is converted from the TIF format to the PDF format in step S34. Further, since the file transmission is necessary in step S35, the facsimile image data, which is converted to the PDF format, is stored in the Hoge folder 230 in step S36. It is noted that trimming, scaling down, scaling up of the image, etc., may be performed when the image is converted to the PDF format. Further, since the e-mail transmission is necessary in step S37, such an e-mail as illustrated in FIG. 25 is transmitted to "abcd@xxxx.co.jp". It is noted that the e-mail to be transmitted has a body in which the storage address of the facsimile image data (faxdata.pdf) that is converted to the PDF format is described as a file storage link, as illustrated in FIG. 25.

The smart phone 11 receives the e-mail transmitted from the information storing device 10 (step S71). It is noted that the reception of the e-mail transmitted from the information storing device 10 may be implemented by the application that is used for the connection to the information storing device 10 or other applications.

The user selects the address (file storage link) described in the body of the e-mail transmitted from the information storing device 10, as illustrated in FIG. 25. The smart phone 11 transmits, to information storing device 10, a demand (facsimile image data acquiring demand) for acquiring the facsimile image data which is converted to the PDF format and stored in the Hoge folder 230 in the information storing device 10 (step S73). If the e-mail is received by an application other than the application used for the access to the information storing device 10, the smart phone 11 launches the application used for access to the information storing device 10 when the file storage link is selected. The smart phone 11 may transmit the facsimile image data acquiring demand to the information storing device 10 using the application used for access to the information storing device 10.

The information storing device 10 transmits the facsimile image data which is converted to the PDF format and stored in the Hoge folder 230 to the smart phone 11 in response to the facsimile image data acquiring demand transmitted from the smart phone 11. In step S75, the smart phone 11 displays the facsimile image data which is converted to the PDF format and transmitted in step S74.

In this way, when the facsimile is transmitted to the MFP 15 at the destination, the user who uses the smart phone 11 can check the content of the facsimile with the smart phone 11.

It is noted that if the MFP 15 at the destination is capable of receiving a plurality of facsimile numbers and the transfer destination can be set for the respective facsimile numbers, a plurality of the facsimile reception workflow folders 220 may be generated and the respective facsimile reception workflow folders 220 may be the transfer destinations. Storing the facsimile image data in different facsimile reception workflow folders 220 enables the information storing device 10 to transmit the e-mail to the different e-mail addresses.

For example, when the MFP 15 at the destination is capable of receiving the facsimile to the facsimile number 000-0001 as well as the facsimile to the facsimile number 000-0002, the facsimile reception workflow folders 220 of the respective facsimile numbers are set as different transfer destinations. In this way, the information storing device 10 copies the facsimile image data transmitted to the facsimile number 000-0001 in the Hoge folder 230, enabling the notification to the e-mail address of the user A. Further, the information storing device 10 copies the facsimile image data transmitted to the facsimile number 000-0002 in the Hoge2 folder 231, enabling the notification to the e-mail address of the user B. With this arrangement, the information storing device 10 can perform the notification to different users on a facsimile number basis.

It is noted that the functions of the information storing device according to the embodiment may be implemented by information processing devices such as a plurality of PCs.

SUMMARY

According to the cooperative processing system of the embodiment, since the information storing device 10 is provided with the WebAPI 201 and the SMB connecting part 202 as an interface to the workflow folder 211, it becomes possible for such a information processing device and an electronic apparatus, which cannot utilize the SMB protocol, to execute the workflow.

Further, when an error occurs at the execution of the workflow, the information storing device 10 generates the error content description file 1102 and stores the generated error content description file 1102 in the workflow folder 211, which enables providing the error content description file 1102 utilizing the WebAPI 201.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

The present application is based on Japanese Priority Application No. 2012-154921, filed on Jul. 10, 2012, Japanese Priority Application No. 2013-100636, filed on May 10, 2013, and Japanese Priority Application No. 2013-127511, filed on Jun. 18, 2013, the entire contents of which are hereby incorporated by reference.

What is claimed is:

1. An information storing device, comprising:
   a nonvolatile storage device in which a plurality of storage areas are generated for storing electronic data therein, wherein in the storage device first and second processes can be set in the storage areas, respectively, on a storage area basis, the first process is to be performed on the electronic data stored in the storage area and the second process is to be performed using the electronic data stored in the storage area;
   a storing part configured to, when the information storing device has received electronic data and a designation of the storage area among the storage areas of the storage device from one of a plurality of electronic apparatuses, store the received electronic data in the storage area designated by the received designation; and
   an executing part configured to, when the received electronic data is stored by the storing part, determine whether the first process is set in the storage area in which said electronic data is stored to perform the first process on the stored electronic data if the first process is set in the storage area in which said electronic data is stored, and determine whether the second process is set in the storage area in which said electronic data is stored to perform the second process using the stored electronic data if the second process is set in the storage area in which said electronic data is stored, wherein
   the second process selectively includes attaching the electronic data to an e-mail to transmit the e-mail having the electronic data attached thereto to a predetermined destination, or storing the electronic data in another storage area of the information storing device,
   when the second process is attaching the electronic data to the e-mail to transmit the e-mail having the electronic data attached thereto to the predetermined destination, the executing part transmits the e-mail having the electronic data attached thereto to the predetermined destination, and
   when the second process is storing the electronic data in another storage area of the information storing device, the executing part transmits information to a predetermined destination upon a completion of the second process, the information indicating the storage area of the information storing device in which the electronic data is stored.

2. The information storing device of claim 1, further comprising:
   a setting part configured to set at least one of the first and second processes, on a storage area basis, for the storage areas of the storage device.

3. The information storing device of claim 2, further comprising:
   a transmitter configured to transmit, in response to a request from the electronic apparatus, to said electronic apparatus a setting screen for accepting a setting related to at least one of the first and second processes in the storage area; and
   a receiver configured to receive the setting, which has been input via the setting screen, from the electronic apparatus to which the setting screen has been transmitted by the transmitter, wherein
   the setting part sets, based on the setting received by the receiver, at least one of the first and second processes in the storage area, among storage areas of the storage device, said storage area being determined based on the received setting.

4. The information storing device of claim 1, wherein, when the first and second processes are set in a certain storage area of the storage device, the executing part performs the first process on the stored electronic data and performs the second process using the electronic data on which the first process has been performed.

5. The information storing device of claim 1, further comprising:
   a detecting part configured to detect that the electronic data has been stored in the storage area of the storage device, wherein
   when the detecting part detects that the electronic data has been stored, the executing part performs the first or second process set in the storage area in which the electronic data has been stored.

6. The information storing device of claim 1, wherein the first process is converting a data form of the electronic data.

7. The information storing device of claim 1, further comprising: a predefined interface for receiving the electronic data and the designation of the storage area from the electronic apparatuses.

8. The information storing device of claim 7, wherein, when the electronic data and the designation of the storage area is received from the one of the electronic apparatuses via the interface according to a capability of said electronic apparatus, the storing part stores the received electronic data in the designated storage area.

9. An information storing system including one or more information processing devices connectable to a plurality of electronic apparatuses, the one or more information processing devices comprising:
   a processor;
   a nonvolatile storage device having a plurality of storage areas in which electronic data is stored, wherein in the storage device first and second processes can be set in the storage areas, respectively, on a storage area basis, a first process is to be performed on the electronic data stored in the storage area and a second process is to be performed using the electronic data stored in the storage area, wherein the storage device further having one or more programs to be executed by the processor;

wherein the one or more programs including instructions for:

storing, when the one or more information processing devices have received electronic data and a designation of the storage area among the storage areas of the storage device from one of the plurality of the electronic apparatuses, the received electronic data in the storage area designated by the received designation; and when the received electronic data has been stored, determining, whether the first process is set in the storage area in which said electronic data is stored, to perform the first process on the stored electronic data if the first process is set in the storage area in which said electronic data is stored, and determining, whether the second process is set in the storage area in which said electronic data is stored, to perform the second process using the stored electronic data if the second process is set in the storage area in which said electronic data is stored, wherein the second process selectively includes attaching the electronic data to an e-mail to transmit the e-mail having the electronic data attached thereto to a predetermined destination, or storing the electronic data in another storage area of the storage device, when the second process is attaching the electronic data to the e-mail to transmit the e-mail having the electronic data attached thereto to the predetermined destination, performing the second process includes transmitting the e-mail having the electronic data attached thereto to the predetermined destination, and when the second process is storing the electronic data in another storage area of the storage device, performing the second process includes transmitting information to a predetermined destination upon a completion of the second process, the information indicating the storage area of the storage device in which the electronic data is stored.

10. A method of storing information, the method being performed in an information storing device which includes a nonvolatile storage device in which electronic data is stored, the method comprising:

generating a plurality of storage areas in the storage device in which first and second processes can be set, respectively, wherein a first process is to be performed to the stored electronic data and a second process is to be performed using the stored electronic data;

storing, when the information storing device has received electronic data and a designation of the storage area among the generated storage areas of the storage device from one of the plurality of the electronic apparatuses, the received electronic data in the storage area designated by the received designation; and when the received electronic data is stored by the storing part, determining, whether the first process is set in the storage area in which said electronic data is stored, to perform the first process on the stored electronic data if the first process is set in the storage area in which said electronic data is stored, and determining, whether the second process is set in the storage area in which said electronic data is stored, to perform the second process using the stored electronic data if the second process is set in the storage area in which said electronic data is stored, wherein the second process selectively includes attaching the electronic data to an e-mail to transmit the e-mail having the electronic data attached thereto to a predetermined destination, or storing the electronic data in another storage area of the information storing device, when the second process is attaching the electronic data to the e-mail to transmit the e-mail having the electronic data attached thereto to the predetermined destination, performing the second process includes transmitting the e-mail having the electronic data attached thereto to the predetermined destination, and when the second process is storing the electronic data in another storage area of the information storing device, performing the second process includes transmitting information to a predetermined destination upon a completion of the second process, the information indicating the storage area of the information storing device in which the electronic data is stored.

* * * * *